(12) United States Patent
Sawada et al.

(10) Patent No.: US 8,074,442 B2
(45) Date of Patent: Dec. 13, 2011

(54) METHOD OF DETERMINING ABNORMALITY IN PARTICULATE FILTER

(75) Inventors: Hiroshi Sawada, Gotenba (JP); Daisuke Shibata, Numazu (JP); Keisuke Fukuoka, Shizuoka (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1366 days.

(21) Appl. No.: 11/629,998

(22) PCT Filed: Jun. 21, 2005

(86) PCT No.: PCT/JP2005/011691
§ 371 (c)(1),
(2), (4) Date: Dec. 19, 2006

(87) PCT Pub. No.: WO2005/124118
PCT Pub. Date: Dec. 29, 2005

(65) Prior Publication Data
US 2008/0041035 A1    Feb. 21, 2008

(30) Foreign Application Priority Data
Jun. 21, 2004 (JP) .................................. 2004-182777

(51) Int. Cl.
*F01N 3/00* (2006.01)
(52) U.S. Cl. ................. 60/277; 60/274; 60/284; 60/287; 60/311
(58) Field of Classification Search ............... 60/274, 60/277, 285, 295, 297, 311
See application file for complete search history.

(56) References Cited

U.S. PATENT DOCUMENTS

| | | | | |
|---|---|---|---|---|
| 5,133,184 | A | * | 7/1992 | Geiger ............................ 60/274 |
| 5,177,463 | A | * | 1/1993 | Bradshaw et al. ............ 340/438 |
| 5,488,938 | A | * | 2/1996 | Ohuchi .................... 123/568.16 |
| 5,647,205 | A | * | 7/1997 | Wier et al. ...................... 60/274 |
| 5,732,549 | A | | 3/1998 | Treinies et al. |
| 5,860,277 | A | * | 1/1999 | Schnaibel et al. .............. 60/274 |
| 6,237,326 | B1 | * | 5/2001 | Russell ........................... 60/274 |

(Continued)

FOREIGN PATENT DOCUMENTS
DE          103 46 029 A1      4/2004
(Continued)

OTHER PUBLICATIONS

Dec. 15, 2009 Notice of Reason for Rejection issued in Japanese Patent Application No. 2006-167609 (with translation).

*Primary Examiner* — Thomas Denion
*Assistant Examiner* — Jesse Bogue
(74) *Attorney, Agent, or Firm* — Oliff & Berridge, PLC

(57) ABSTRACT

An object of the invention is to realize a method of determining an abnormality in a particulate filter (5) capable of trapping and oxidizing particulate matter contained in exhaust gas in which even a minor abnormality in which small quantity of particulate matter can pass through the particulate filter (5) can be determined with a high degree of accuracy. To achieve this object, the abnormality determination method according to the invention, the transition of the inflowing exhaust gas temperature in and the outflowing exhaust gas temperature out of the particulate filter (5) during deceleration operating, and the degree of decrease in the outflowing exhaust gas temperature relative to the inflowing exhaust gas temperature is computed based on the transition. If the degree of decrease exceeds a threshold value, it is determined that the particulate filter (5) is abnormal.

14 Claims, 10 Drawing Sheets

U.S. PATENT DOCUMENTS

| | | | |
|---|---|---|---|
| 6,962,046 B2 * | 11/2005 | Kuboshima et al. | 60/295 |
| 7,228,223 B2 * | 6/2007 | Braun | 701/114 |
| 7,647,764 B2 * | 1/2010 | Plote et al. | 60/274 |
| 2003/0230060 A1 * | 12/2003 | Yahata et al. | 55/282.3 |
| 2004/0006977 A1 * | 1/2004 | Nakatani et al. | 60/288 |
| 2004/0020194 A1 * | 2/2004 | Nishimura et al. | 60/297 |
| 2004/0103654 A1 * | 6/2004 | Ohtake et al. | 60/295 |
| 2004/0123586 A1 | 7/2004 | Kuboshima et al. | |
| 2005/0143897 A1 | 6/2005 | Ripper et al. | |
| 2005/0268597 A1 * | 12/2005 | Kosaka | 60/277 |
| 2006/0032217 A1 * | 2/2006 | Kondou et al. | 60/297 |

FOREIGN PATENT DOCUMENTS

| | | |
|---|---|---|
| EP | 1 052 385 A2 | 11/2000 |
| FR | 2 804 177 | 7/2001 |
| FR | 2 863 660 | 6/2005 |
| JP | A 59-020512 | 2/1984 |
| JP | B2 3-38406 | 6/1991 |
| JP | A 05-098941 | 4/1993 |
| JP | A 06-123216 | 5/1994 |
| JP | A 06-323127 | 11/1994 |
| JP | A 06-330730 | 11/1994 |
| JP | 07-180528 * | 7/1995 |
| JP | A 07-180528 | 7/1995 |
| JP | A 08-121150 | 5/1996 |
| JP | A 08-507843 | 8/1996 |
| JP | A 11-093645 | 4/1999 |
| JP | A-11-125114 | 5/1999 |
| JP | A 2001-207828 | 8/2001 |
| JP | A 2001-271639 | 10/2001 |
| JP | A 2002-122019 | 4/2002 |
| JP | A 2003-269223 | 9/2003 |
| JP | A 2004-019529 | 1/2004 |
| JP | A 2004-124855 | 4/2004 |

* cited by examiner

METHOD OF DETERMINING ABNORMALITY IN PARTICULATE FILTER

TECHNICAL FIELD

The present invention relates to a technology for determining an abnormality in a particulate filter provided in an exhaust passage of an internal combustion engine.

BACKGROUND ARTS

In recent years, various technologies for determining an abnormality in a particulate filter in an internal combustion engine used in a vehicle etc. have been proposed. In a known technology for determining a filter abnormality, as disclosed in Japanese Patent Publication No. 3-38406, an abnormality in a filter is determined based on a comparison of the exhaust gas pressure in the upstream of the filter at a predetermined time after start of filter regeneration and a reference pressure that is determined by the operating state of the engine at that time.

Japanese Patent Application Laid-Open No. 6-323127 discloses a technology of determining an abnormality in a filter by comparing the pressure difference between the upstream and the downstream of the filter just after filter regeneration and the pressure difference in normal time.

Japanese Patent Application Laid-Open No. 6-123216 discloses a technology of determining an abnormality of a filter by determining an expected value of pressure acting on the filter element based on the integrated operation time of the internal combustion engine and the number of engine revolutions at that time and comparing the expected value and an actual pressure.

Japanese Patent Application Laid-Open No. 6-330730 discloses a technology of determining an abnormality of a filter, in which timing for performing the regeneration of the filter is determined based on an estimated amount of trapped particulate matter (particulate matter will be referred to as PM hereinafter) trapped in the filter and also determined based on the integrated number of engine revolutions since the last regeneration, and an abnormality of the filter is determined based on a comparison of these two types of filter regeneration timing. In the technology disclosed in this document, the amount of trapped PM trapped in the filter is estimated using the exhaust gas temperature and the pressure in the upstream and the downstream of the filter as parameters.

In a technology disclosed in Japanese Patent Application Laid-Open No. 7-180528, when the exhaust gas pressure in the downstream of a filter deviates from a predetermined range, it is determined that an abnormality occurs in catalyst or an exhaust passage in the downstream of the filter.

In a technology disclosed in Japanese Patent Application Laid-Open No. 2001-207828, the actual degree of opening of an EGR valve is detected while the degree of opening of an EGR valve is feedback-controlled in such a way that the intake air quantity of the internal combustion engine becomes a target intake air quantity, and when the degree of opening of the EGR valve detected is larger than the degree of opening in the case where the filter is normal, it is determined that the filter is broken.

In a technology disclosed in Japanese Patent Application Laid-Open No. 5-98941, a reflectometer composed of a light source and a light receiving portion is provided in the downstream of a filter, and cracks of the filter are detected based on the reflectivity of light measured by the reflectometer.

In a technology disclosed in Japanese Patent Application Laid-Open No. 8-121150, a sound sensor that senses sounds of a high frequency range is provided in a filter, and clogging and breakage of the filter is detected based on the loudness of the sound sensed by the sound sensor.

When a minor abnormality in which a small amount of PM is allowed to pass through a filter occurs in the filter, the exhaust gas pressure in the upstream of the filter and the pressure difference between the upstream and the downstream of the filter will change slightly, but it is difficult to distinguish such changes from those caused by changes in the amount of the PM trapped in the filter.

Therefore, it is difficult to detect a minor abnormality in a filter by the methods disclosed in Japanese Patent Publication No. 3-38406, Japanese Patent Application Laid-Open No. 6-323127, Japanese Patent Application Laid-Open No. 6-123216, Japanese Patent Application Laid-Open No. 6-330730, Japanese Patent Application Laid-Open No. 7-180528 and Japanese Patent Application Laid-Open No. 2001-207828.

In addition, in the case in which a reflectometer or a sound sensor is provided in the downstream of a filter or in a filter, there is a risk that accuracy of detection by the sensors can be deteriorated by soot adhering to them or by high temperature environment condition under which they are used. Accordingly, it is sometimes difficult for the methods disclosed in Japanese Patent Application Laid-Open No. 5-98941 and Japanese Patent Application Laid-Open No. 8-121150 to detect a minor abnormality in the filter.

DISCLOSURE OF THE INVENTION

The present invention has been made in view of the above-described circumstances. An object of the present invention is to provide a method of determining an abnormality in a filter that can trap and oxidize PM in exhaust gas with which a minor abnormality in which a small quantity of PM is allowed to pass through the filter can be detected with a high degree of accuracy.

To achieve the above object, according to the present invention, in a method of determining an abnormality in a particulate filter for trapping and oxidizing PM, or in a particulate filter on which catalyst having an oxidizing ability is supported, an abnormality of the filter is determined based on behavior of the temperature of the exhaust gas flowing out of the particulate filter.

The inventors of the present invention performed various experiments and studies with a view to achieve the above object and discovered that when an abnormality that allows passing of PM through the particulate filter is occurring in the particulate filter, the temperature of the exhaust gas flowing out of the particulate filter (which temperature will be referred to as the outflowing exhaust gas temperature hereinafter) shows peculiar behavior.

For example, in the case where a particulate filter is normal, there is a delay in a change in the outflowing exhaust gas temperature in response to a change in the temperature of the exhaust gas flowing into the particulate filter (which temperature will be referred to as the inflowing exhaust gas temperature hereinafter), and the amount of the change in the outflowing exhaust gas temperature is small. In contrast, in the case where the particulate filter is abnormal, the response delay in a change in the outflowing exhaust gas temperature to a change in the inflowing exhaust gas temperature decreases, and the amount of the change in the outflowing exhaust gas temperature increases. In other words, when the particulate filter is abnormal, behavior of the outflowing exhaust gas temperature comes near to behavior of the inflowing exhaust gas temperature.

Although the mechanism of appearance of the above-described behavior has not been elucidated, the outline of the mechanism is supposed to be as follows.

When exhaust gas flows through a normal particulate filter, heat exchange between the particulate filter and the exhaust gas occurs, and heat generated by oxidation reaction of PM and hydrocarbon etc. is transferred to the exhaust gas.

On the other hand, when a part of the particulate filter is broken and passing of PM through the particulate filter occurs, gas-flow resistance at the broken portion becomes lower than that in the other portions (namely, the pressure at the broken portion becomes lower than the pressure of the other portions), and flow of the exhaust gas concentrates at the broken portion accordingly. When the exhaust gas flow concentrates at the broken portion, the flow velocity of the exhaust gas increases, and it is considered that the rate of the above-mentioned heat exchange and heat transfer decrease accordingly.

Moreover, it is expected that the amount of the PM trapped in the broken portion becomes smaller than in normal time. With a decrease in the amount of the PM trapped in the broken portion, oxidation reaction heat generated at the broken portion decreases. This results in a decrease in the heat that exhaust gas receives while flowing through the particulate filter.

Thus, when an abnormality that allows passing of PM occurs in a particulate filter, the heat that exhaust gas receives and gives in the particulate filter decreases. Consequently, when the particulate filter is abnormal, behavior of the outflowing exhaust gas temperature comes near to behavior of the inflowing exhaust gas, it is considered.

In view of the above, in the present invention, transition of the outflowing exhaust gas temperature of particulate filter relative to the inflowing exhaust gas temperature (in other words, history of changes in the outflowing exhaust gas temperature of a particulate filter relative to the inflowing exhaust gas temperature) is detected, and an abnormality in the particulate filter is determined based on the transition.

Specific examples of the determination method are (1) a method in which the particulate filter is determined to be abnormal if the response delay time from the start of a change in the inflowing exhaust gas temperature to the start of a change in the outflowing exhaust gas temperature is smaller than a predetermined time, (2) a method in which the particulate filter is determined to be abnormal if the relative difference between the amount of change in the inflowing exhaust gas temperature and the amount in change of the outflowing exhaust gas temperature is smaller than a predetermined, (3) a method in which the particulate filter is determined to be abnormal if the ratio of the change rate of the outflowing exhaust gas temperature to the change rate of the inflowing exhaust gas temperature exceeds a predetermined ratio, and (4) a method in which the particulate filter is determined to be abnormal if at least two of the conditions stated in above (1) to (3) are satisfied.

According to the determination method according to the present invention, if passing of PM through a particulate filter occurs, it is possible to detect peculiar behavior of the outflowing exhaust gas temperature.

Furthermore, in the determination method according to the present invention, since the transition of the outflowing exhaust gas temperature relative to the inflowing exhaust gas temperature is detected, determination can be made while using the whole of changes as a parameter. Consequently, determination errors are unlikely to occur even in the case in which the inflowing exhaust gas temperature or the outflowing exhaust gas temperature temporarily changes due to a variation in the combustion condition of the engine or other reasons and in the case in which appearance of the above-described peculiar behavior is faint.

Therefore, it is possible to determine occurrence of an abnormality with a high degree of accuracy even if the abnormality is minor one in which only a small amount of PM passes through the particulate filter.

When a part of the particulate filter is broken and passing of PM occurs, it is considered that the higher the flow velocity of the exhaust gas flowing through the broken portion is, the lower the rate of the aforementioned heat exchange and heat transfer becomes. In view of this, the abnormality determination according to the present invention may be performed when the intake air quantity of the internal combustion engine is no less than (larger than or equal to) a predetermined quantity.

Another cause of an increase in the flow velocity at the broken portion is the pressure difference between the broken portion and the other portions. Specifically, the higher the pressure at the other portions relative to the broken portion is, the higher the flow velocity at the broken portion becomes. In view of the fact that the pressure at the other portions increases with an increase in the amount of the PM trapped, the abnormality determination may be performed on condition that the amount of the trapped PM is no less than a predetermined amount.

The abnormality determination according to the present invention may be performed when the particulate filter is in the state in which it is capable of continuously oxidizing PM (specifically, when the catalyst supported on the particulate filter is in the state in which it is capable of continuously oxidizing PM).

When the catalyst is not in the state in which it is capable of continuously oxidizing PM, the quantity of heat generated by oxidation reaction in the particulate filter becomes small. Accordingly, the difference between the quantity of heat exhaust gas exchanges in normal time and the quantity of heat exhaust gas exchanges in abnormal time becomes small.

In contrast, when the catalyst is in the state in which it is capable of continuously oxidizing PM, the quantity of heat generated by oxidation reaction in the particulate filter becomes large. Accordingly, the difference between the quantity of heat exhaust gas exchanges in normal time and the quantity of heat exhaust gas exchanges in abnormal time becomes large.

Accordingly, distinction between the behavior of the outflowing exhaust gas temperature in normal time and the behavior of the outflowing exhaust gas temperature in abnormal time appears more clearly when the catalyst is in the state in which it is capable of continuously oxidizing particulate mater than when the catalyst is not in the state in which it is capable of continuously oxidizing particulate mater.

In view of the above-described finding, if the abnormality determination is performed when the catalyst is in the state in which it is capable of oxidizing PM, accuracy of the determination can be enhanced and it is possible to determine also deterioration of the catalyst (i.e. deterioration in the oxidizing capacity of the catalyst).

Moreover, the inventors of the present invention performed experiments and studies on the above-mentioned peculiar behavior of the outflowing exhaust gas temperature under various conditions and found that the peculiar behavior of the outflowing exhaust gas temperature appears more distinctly when the internal combustion engine is in a deceleration operating state, namely when the outflowing exhaust gas temperature decreases.

In view of the above, the abnormality determination according to the present invention may be performed while the internal combustion engine is in a deceleration operating state. If the abnormality determination is performed while the internal combustion engine is in a deceleration operating state, the degree of accuracy of the determination can be enhanced since the peculiar behavior of the outflowing exhaust gas temperature appears more distinctly. Furthermore, temperature sensors with high versatility may be used as the temperature sensors for detecting the inflowing exhaust gas temperature and the outflowing exhaust gas temperature.

If the time period over which transition of the inflowing exhaust gas temperature and the outflowing exhaust gas temperature are detected is too short, there is a risk that accuracy of the determination may be deteriorated. Therefore, the abnormality determination may be designed to be performed during a time period from a time before start of deceleration operating until idle operating time becomes no less than a predetermined time, on condition that idle operating is continued no less than the predetermined time after deceleration operating in the internal combustion engine.

In the present invention, if the abnormality determination is performed while the internal combustion engine is in a deceleration operating state, the EGR may be stopped, and/or the degree of opening of the inlet throttle valve may be increased.

The EGR mentioned here includes recirculation of exhaust gas from the exhaust passage in the upstream of the particulate filter to the intake passage, recirculation of exhaust gas from the exhaust passage in the downstream of the particulate filter to the intake passage, and a process of increasing residual exhaust gas in the combustion chamber by a variable valve mechanism.

As described before, it is considered that when a part of the particulate filter is broken and passing of PM occurs, the quantity of heat that exhaust gas exchanges will decrease due to an increase in the flow velocity of the exhaust gas flowing through the broken portion. Accordingly, if the flow velocity of the exhaust gas flowing through the broken portion increases, the quantity of heat that exhaust gas exchanges further decreases, and the peculiar behavior of the outflowing exhaust gas temperature appears more distinctly. In addition, it is considered that the lower the temperature of the exhaust gas flowing into the particulate filter is, in other words, the larger the difference between the temperature of the particulate filter and the inflowing exhaust gas temperature is, the more distinctly the peculiar behavior of the outflowing exhaust gas temperature appears.

Accordingly, if the EGR is stopped and/or the degree of opening of the inlet throttle valve is increased during execution of the abnormality determination, it is possible to increase the flow velocity of the exhaust gas flowing through the broken portion and the inflowing exhaust gas temperature is likely to decrease, since the flow quantity and flow velocity of the exhaust gas flowing into the particulate filter increase. Consequently, the degree of accuracy of determination will be further enhanced.

In addition, if the flow velocity of the exhaust gas flowing through the broken portion is increased and the temperature of exhaust gas is decreased, the degree of decrease in the outflowing exhaust gas temperature becomes remarkably large. Accordingly, determination errors are unlikely to occur even if the time period over which transition of the inflowing exhaust gas temperature and the outflowing exhaust gas temperature are detected is shortened. As a result, the frequency of execution of the abnormality determination can be increased.

Alternatively, the abnormality determination according to the present invention may be performed based on the degree of decrease in the outflowing exhaust gas temperature during deceleration operating.

When the particulate filter is normal, the degree of decrease in the outflowing exhaust gas temperature during deceleration operating is small. However, when the particulate filter is abnormal, the degree of decrease in the outflowing exhaust gas temperature during deceleration operating becomes remarkably large.

Accordingly, if the difference (or the temperature decrease) between the outflowing exhaust gas temperature before start of deceleration operating and the outflowing exhaust gas temperature after deceleration operating exceeds a threshold value, it may be determined that the particulate filter is abnormal.

Still further, the inventors of the present invention performed further experiments and verifications on behavior of the outflowing exhaust gas temperature during deceleration operating, and found that when the particulate filter is normal, the amount of decrease in temperature is substantially the same between in the case in which the amount of the PM trapped in the particulate filter is relatively large and in the case in which the amount of the trapped PM is relatively small, but when the particulate filter is abnormal, there is a significant difference in the amount of decrease in temperature between both the cases.

Therefore, if the difference between the amount of decrease in temperature at a time when the amount of the trapped PM is relatively large and the amount of decrease in temperature at a time when the amount of the trapped PM is relatively small exceeds a threshold value, it may be determined that the particulate filter is abnormal.

The time when the amount of the trapped PM is relatively large is, for example, a time just before regeneration process (This process is for regenerating the PM trapping ability of the particulate filter) of the particulate filter is performed. The time when the amount of the trapped PM is relatively small is, for example, a time just after regeneration process is performed.

In the various abnormality determination methods described above, estimation of the amount of the PM trapped in the particulate filter may be performed, and a criterion of the determination may be changed in accordance with the estimated amount of the trapped PM.

When the particulate filter is normal, with an increase in the amount of the trapped PM, the flow velocity of exhaust gas decreases and the quantity of heat generated by oxidation reaction increases. Accordingly, when the particulate filter is normal, the quantity of heat that exhaust gas exchanges increases with an increase in the amount of the trapped PM.

In contrast, when the particulate filter is abnormal, with an increase in the amount of the trapped PM, the flow velocity of the exhaust gas flowing through a broken portion of the particulate filter increases, and therefore the quantity of heat that exhaust gas exchanges in the particulate filter decreases. Conversely, the smaller the amount of the trapped PM is, the more hardly the flow velocity of the exhaust gas flowing through the broken portion increases, and therefore the quantity of heat that exhaust gas exchanges in the particulate filter is hardly to decrease.

Therefore, when the amount of the trapped PM is large, the peculiar behavior of the outflowing exhaust gas temperature appears more distinctly than when the amount of the trapped PM is small. In view of this, when the amount of the trapped PM is large, it is possible to enhance the degree of accuracy of the abnormality determination by making the determination criterion high as compared to when the amount of the trapped PM is small. Conversely, when the amount of the trapped PM is small, determination of an abnormality in the particulate filter can be made easy by making the determination criterion low as compared to when the amount of the trapped PM is large.

The abnormality determination method according to the present invention may be combined with an abnormality determination method that uses pressure difference between the upstream and the downstream of the particulate filter. When they are used in combination, since doubled abnormality determination is performed by the abnormality determination based on behavior of the outflowing exhaust gas temperature and the abnormality determination based on pressure difference between the upstream and the downstream of the particulate filter, determination errors are prevented reliably.

In connection with the above, abnormality detection may be designed in such a way that when the internal combustion engine is in a deceleration operating state, the abnormality determination based on behavior of the outflowing exhaust gas temperature be performed, and when the internal combustion engine is in a high-load and high-speed operating state, the abnormality determination based on the pressure difference between the upstream and the downstream of the particulate filter be performed.

In this case, it is possible to determine an abnormality in the particulate filter in the high-speed and high-load range as well as the deceleration operating range. Thus, the range of operating in which abnormality determination is possible is extended, and it is possible to increase the frequency of execution of abnormality determination.

In the abnormality determination according to the present invention, estimation of the outflowing exhaust gas temperature after deceleration operating may be performed by computation, and abnormality determination may be performed by comparing an actual outflowing exhaust gas temperature and the computed estimation value.

In this case, if the difference between the computed estimation value and the actual outflowing exhaust temperature does not exceed a threshold value, it is determined that the particulate filter is normal, and if the difference between the computed estimation value and the actual outflowing exhaust temperature exceeds the threshold value, it is determined that the particulate filter is abnormal.

With such an abnormality determination method, it is possible to perform abnormality determination easily, in a short time.

DESCRIPTION OF THE PREFERRED EMBODIMENT

In the following, specific embodiments of the present invention will be described with reference to the drawings.

Figure 1:
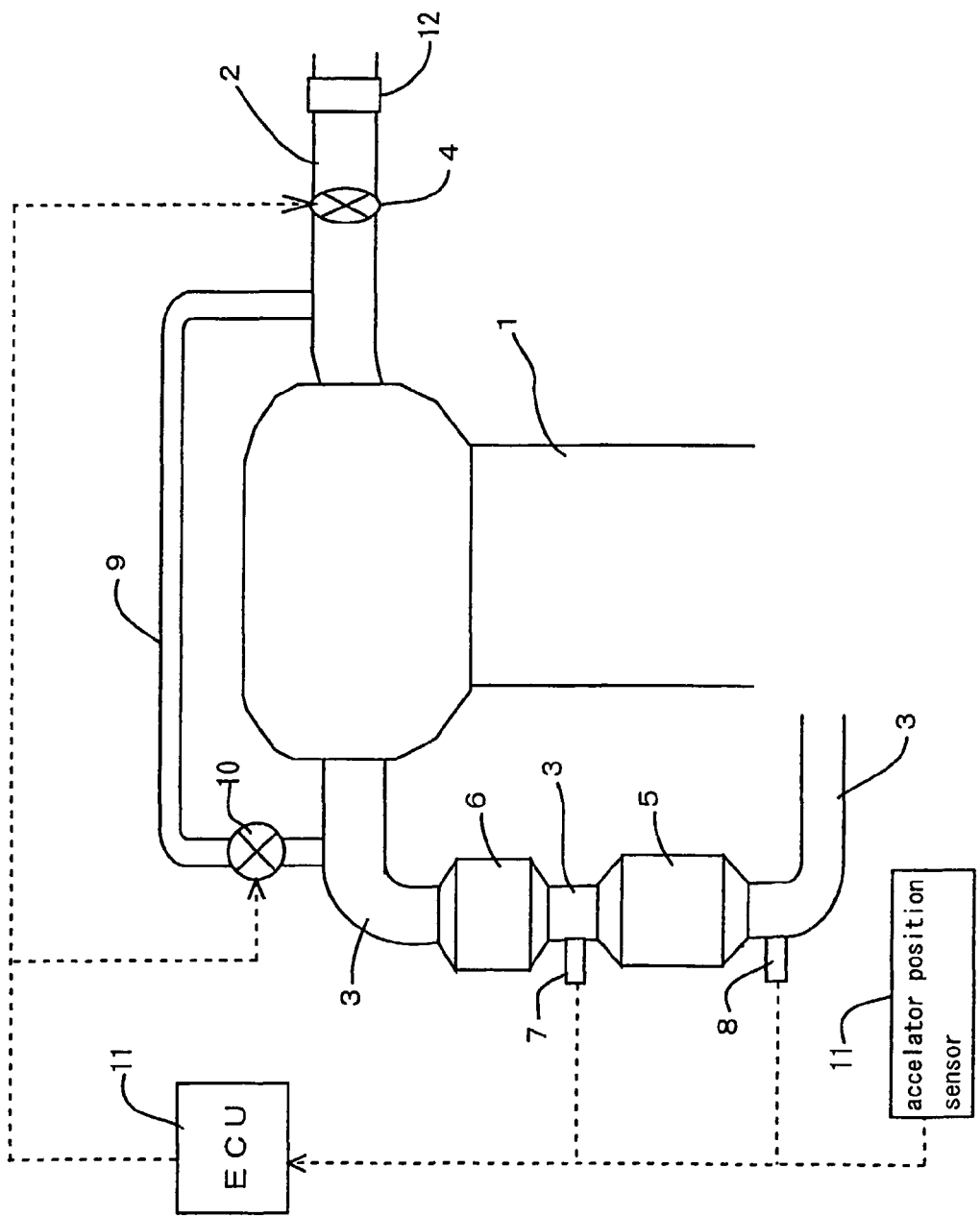
FIG. 1 is a diagram schematically showing an internal combustion engine to which the present invention is applied.

FIG. 1 is a diagram schematically showing an internal combustion engine to which the present invention is applied. The internal combustion engine 1 shown in FIG. 1 is a compression ignition diesel engine. An intake passage 2 and an exhaust passage 3 are connected to the engine 1. The intake passage 2 is equipped with an inlet throttle valve 4 and an air flow meter 12. In the exhaust passage 3, a particulate filter 5 is provided.

The particulate filter 5 has a wall-flow type carrier and is adapted to trap PM in the exhaust gas. The carrier of the particulate filter 5 supports catalyst having an oxidizing ability, and it is capable of oxidizing trapped PM in the filter or included in the exhaust gas.

In the portion of the exhaust passage 3 upstream of the particulate filter 5, there is provided a preliminary catalyst 6. An upstream exhaust gas temperature sensor 7 is provided on the portion of the exhaust passage 3 between the particulate filter 5 and the preliminary catalyst 6. A downstream exhaust gas temperature sensor 8 is provided on the portion of the exhaust passage 3 downstream of the particulate sensor 5. In connection with the above, the preliminary catalyst 6 is not an essential component of the present invention, and it may be eliminated from the upstream of the particulate filter 5.

An EGR passage 9 is provided between the portion of the intake passage 2 downstream of the inlet throttle valve 4 and the portion of the exhaust passage 3 upstream of the preliminary catalyst 6 to bridge these portions. The EGR passage 9 is equipped with an EGR valve 10. In connection with this, in the case where a turbine housing of a centrifugal supercharger is provided in the exhaust passage 3, the EGR passage 9 shall be connected to the portion of the exhaust passage 3 upstream of the turbine housing.

An electronic control unit (ECU) 11 is annexed to the internal combustion engine having the above-described structure. The ECU 11 is an arithmetic and logic unit composed of a CPU, a ROM, a RAM and a backup RAM etc.

The ECU 11 is electrically connected with various sensors such as an accelerator position sensor 11 as well as the upstream exhaust gas temperature sensor 7, the downstream exhaust gas temperature sensor 8 and the air flow meter 12 mentioned above. In addition, the ECU 11 is electrically connected with the inlet throttle valve 4 and the EGR valve 10 so as to be capable of controlling the degree of opening of these valves.

The ECU 11 is adapted to execute determination of an abnormality in a filter in accordance with the concept of the present invention in addition to known control processes such as fuel injection control etc. . . . In the following, a filter abnormality determination control will be described.

The filter abnormality determination control according to the present invention is a control for determining an abnormality in which PM is allowed to pass through the particulate filter 5, for example, an abnormality such as formation of a crack or a hole on the passage wall in the particulate filter 5, using the value of the output signal of the downstream exhaust gas temperature sensor 8 (the outflowing exhaust gas temperature) as a parameter.

The inventors of the present invention endeavored to performed experiments and verifications in seeking a preferred method of determining an abnormality in the particulate filter 5 and discovered the fact that when an abnormality in which PM is allowed to pass through occurs in the particulate filter 5, the outflowing exhaust gas temperature shows peculiar behavior during the period from deceleration operating to idle operating of the internal combustion engine 1.

Figure 2:
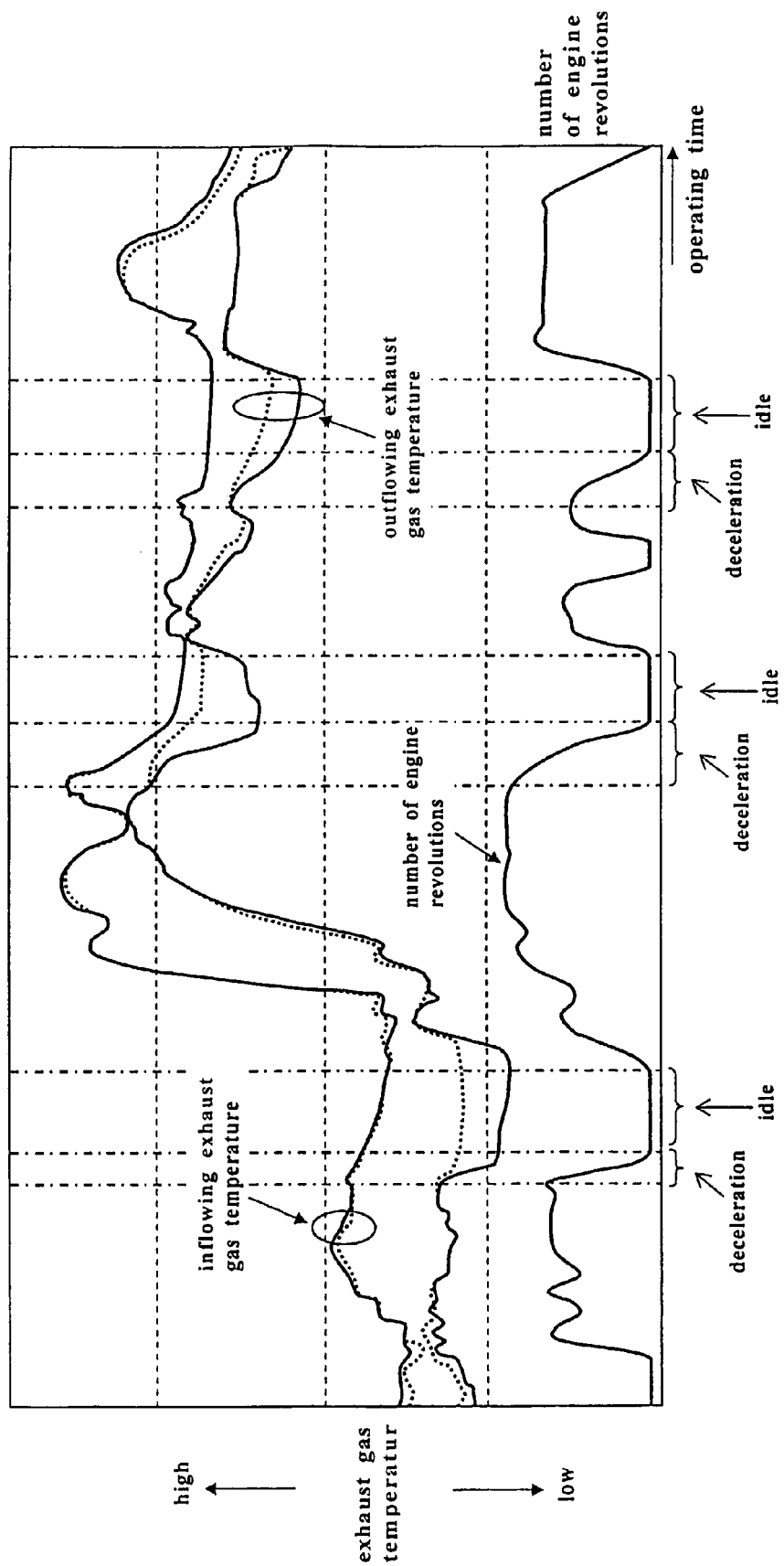
FIG. 2 shows results of measurement of the inflowing exhaust gas temperature and the outflowing exhaust gas temperature of a particulate filter.

FIG. 2 shows results of measurement of the inflowing exhaust gas temperature and the outflowing exhaust gas temperature performed for a normal particulate filter 5 and an abnormal particulate filter 5 through which PM can pass under the same condition.

In FIG. 2, the broken lines represent the inflowing exhaust gas temperature and the outflowing exhaust gas temperature for a normal particulate filter 5, and the solid lines represent the inflowing exhaust gas temperature and the outflowing exhaust gas temperature for an abnormal particulate filter 5 through which PM can pass.

Here, the abnormal particulate filter 5 used in the measurement was one formed by making holes in the passage wall of a normal particulate filter 5.

As seen from the measurement result shown in FIG. 2, in the case where the particulate filter 5 is normal, there is a delay in a change in the outflowing exhaust gas temperature in response to a change in the inflowing exhaust gas temperature, and the degree of changes in the outflowing exhaust gas temperature is small.

On the other hand, in the case where the particulate filter 5 is abnormal, a delay in a change in the outflowing exhaust gas temperature in response to a decreases in the inflowing exhaust gas temperature is shortened and the degree of changes in the outflowing exhaust gas temperature becomes large when the internal combustion engine is in the idle operating state after deceleration operating, especially when idle operating after deceleration operating goes on relatively long.

In other words, in the case where the particulate filter 5 is normal, there is little decrease in the outflowing exhaust gas temperature in response to a decrease in the inflowing exhaust gas temperature, but in the case where the particulate filter 5 is abnormal, the outflowing exhaust gas temperature decreases to a large degree following a decrease in the inflowing exhaust gas temperature.

Furthermore, the inventors of the present invention performed experiments and verifications on the above-mentioned peculiar behavior under various conditions and discovered the following characteristics. That is, (1) the above-mentioned peculiar behavior becomes more distinct in the case where the catalyst supported on the particulate filter 5 is in a state in which it is capable of continuously oxidizing PM than in the case where the catalyst is in a state in which it not capable of continuously oxidizing PM; (2) the larger the quantity of the exhaust gas flowing into the particulate filter 5 is, the more distinct the above-mentioned peculiar behavior appears; and (3) the larger the amount of the PM trapped in the particulate filter 5 is, the more distinct the above-mentioned peculiar behavior appears.

Although the specific mechanism of the above-described behavior and characteristics of the outflowing exhaust gas temperature have not been elucidated, the outline of the mechanism is supposed to be as follows.

When the particulate filter 5 is normal, heat of the particulate filter 5 is transferred to the exhaust gas in the particulate filter 5 and heat (oxidation reaction heat) generated when PM, hydrocarbon (HC) and carbon monoxide (CO) etc. are oxidized by catalysis is transferred to the exhaust gas.

Consequently, when the particulate filter 5 is normal, the temperature of the outflowing exhaust gas is hard to fall even if the temperature of the inflowing exhaust gas falls.

On the other hand, when a part of the particulate filter 5 is broken and passing of PM through the particulate filter occurs, resistance against gas flow at the broken portion becomes lower than that in the other portions (namely, the pressure at the broken portion becomes lower than the pressure of the other portions), so that flow of the exhaust gas concentrates at the broken portion. When the exhaust gas flow concentrates at the broken portion, the flow velocity of the exhaust gas increases, and the rate of the above-mentioned heat transfer decreases accordingly.

To put it differently, when a part of the particulate filter 5 is broken, the most part of the exhaust gas flowing into the particulate filter 5 flows through the broken portion at a high speed, and therefore, the quantity of heat that the exhaust gas receives in the particulate filter decreases.

Furthermore, since the amount of the PM trapped in the neighborhood of the broken portion becomes smaller than in normal time, the quantity of the oxidation reaction heat also decreases. A decrease in the quantity of the oxidation reaction heat in the neighborhood of the broken portion causes, in cooperation with the above-mentioned increase in the flow velocity, a further decrease in heat that the exhaust gas receives.

Accordingly, it is considered that when an abnormality in which PM is allowed to pass through the particulate filter 5 occurs, the outflowing exhaust gas temperature also decreases following a decrease in the inflowing exhaust gas temperature.

In connection with the above, the larger the quantity of flow of the exhaust gas flowing into the particulate filter 5 is, and/or the larger the difference in the resistance against flow between the broken portion and the other portion is, the higher the flow velocity of the exhaust gas flowing through the broken portion of the particulate filter 5 becomes.

The quantity of flow of the exhaust gas flowing into the particulate filter 5 increases proportionally to the quantity of intake air of the internal combustion engine 1. The difference in the resistance against flow between the broken portion and the other portion increases with an increase in the amount of the PM trapped in the particulate filter 5.

Therefore, it is considered that the larger the quantity of intake air in the internal combustion engine 1 is, and/or the larger the amount of the trapped PM in the particulate filter 5 is, the higher the degree of decrease in the outflowing exhaust gas temperature is.

According to the above-described behavior and characteristics of the outflowing exhaust gas temperature, in the case where idle operating of the internal combustion engine 1 is continued for a time period longer than a specific time period after deceleration operating, it is possible to determine an abnormality in the particulate filter 5 by detecting the behavior of the outflowing exhaust gas temperature during the period (which will be referred to as the deceleration idling period) from the time at which deceleration operating is started to the time at which the idle operating time reaches the specific time period and using the behavior as a parameter.

In the following, specific embodiments of the abnormality determination control will be described.

Embodiment 1

Firstly, a description will be directed to a case in which an abnormality in a particulate filter 5 is determined based on a relative relationship between the inflowing exhaust gas temperature and the outflowing exhaust gas temperature during the deceleration idling period.

As described before, the relative relationship between the amount of decrease in the inflowing exhaust gas temperature and the amount of decrease in the outflowing exhaust gas temperature during the deceleration idling period differs between in the case where the particulate filter 5 is normal and in the case where the particulate filter 5 is abnormal.

In the case where the particulate filter 5 is normal, the inflowing exhaust gas temperature decreases in the deceleration idling period, but the outflowing exhaust gas temperature is unlikely to change in this period. In other words, the decrease in the outflowing exhaust gas temperature relative to the decrease in the inflowing exhaust gas temperature is sufficiently small.

On the other hand, in the case where the particulate filter 5 is abnormal, the outflowing exhaust gas temperature also decreases following a decrease in the inflowing exhaust gas temperature. In other words, the decrease in the outflowing exhaust gas temperature relative to the decrease in the inflowing exhaust gas temperature becomes larger.

Figure 3:
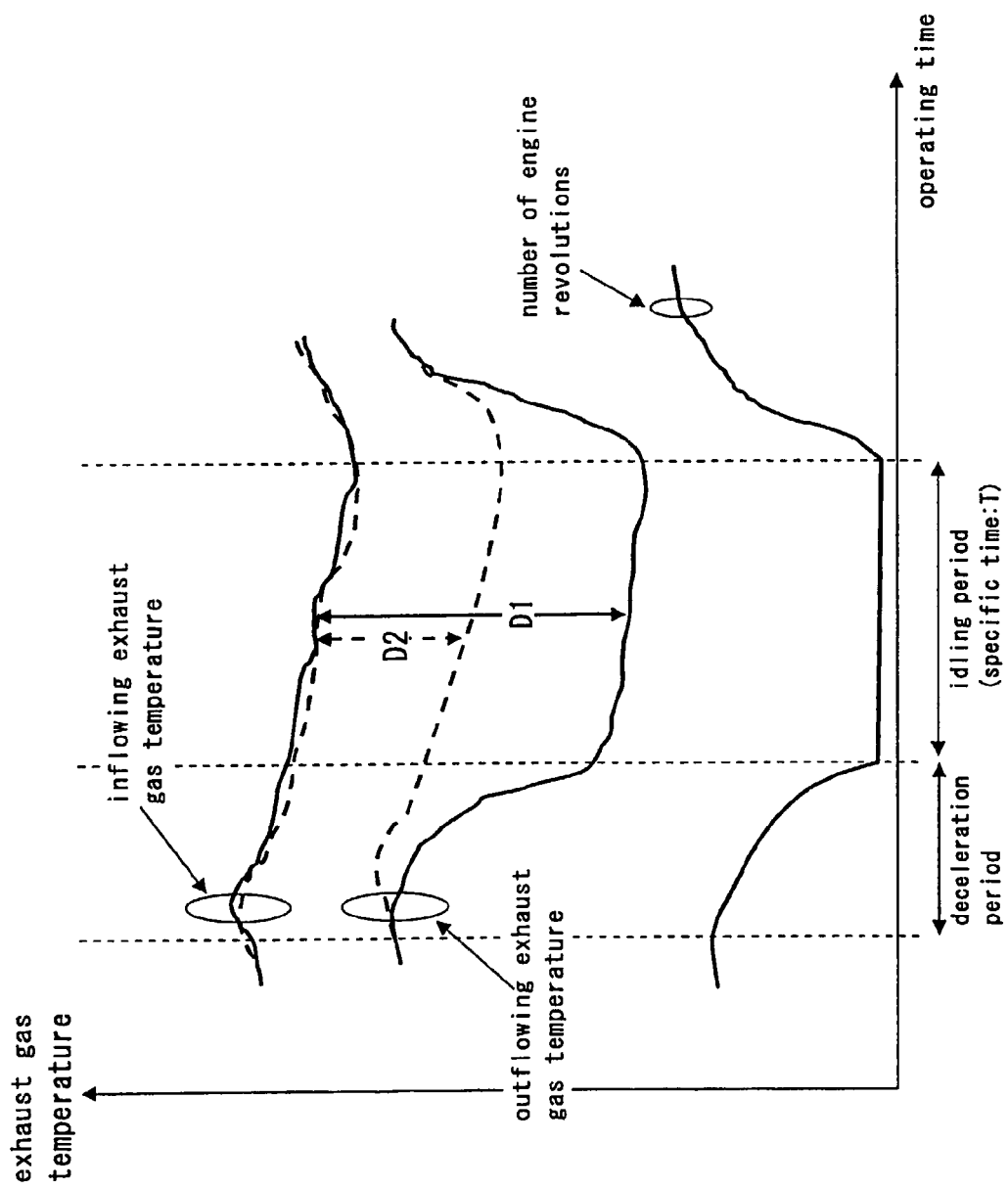
FIG. 3 shows a relative difference between the inflowing exhaust gas temperature and the outflowing exhaust gas temperature during a deceleration idling period.

Accordingly, in the case where the particulate filter 5 is abnormal, the relative difference D1 between the inflowing exhaust gas temperature and the outflowing exhaust gas temperature during the deceleration idling period becomes larger than the relative difference D2 in the case where the particulate filter 5 is normal as shown in FIG. 3.

Based on this fact, the relative difference between the inflowing exhaust gas temperature and the outflowing exhaust gas temperature during the deceleration idling period is computed, and when the relative difference exceeds a threshold value, it may be determined that the particulate filter 5 is abnormal.

In the case where an abnormality of the particulate filter is minor (i.e. where the amount of the PM passing through the filter is small) or in the case where the amount of the trapped PM in the particulate filter 5 is small, there is a possibility that the decrease in the outflowing exhaust gas temperature becomes small. Moreover, the inflowing exhaust gas temperature and the outflowing exhaust gas temperature can change irregularly due to various causes such as a delay in response of the upstream exhaust gas temperature sensor 7 and the downstream exhaust gas temperature sensor 8, a delay in response of the exhaust gas and irregularities in the combustion condition in the internal combustion engine 1.

Therefore, if the relative difference between the inflowing exhaust gas temperature and the outflowing exhaust gas temperature at a time during the deceleration idling period is used as a parameter, there is a possibility that an error in the determination occurs.

Figure 4:
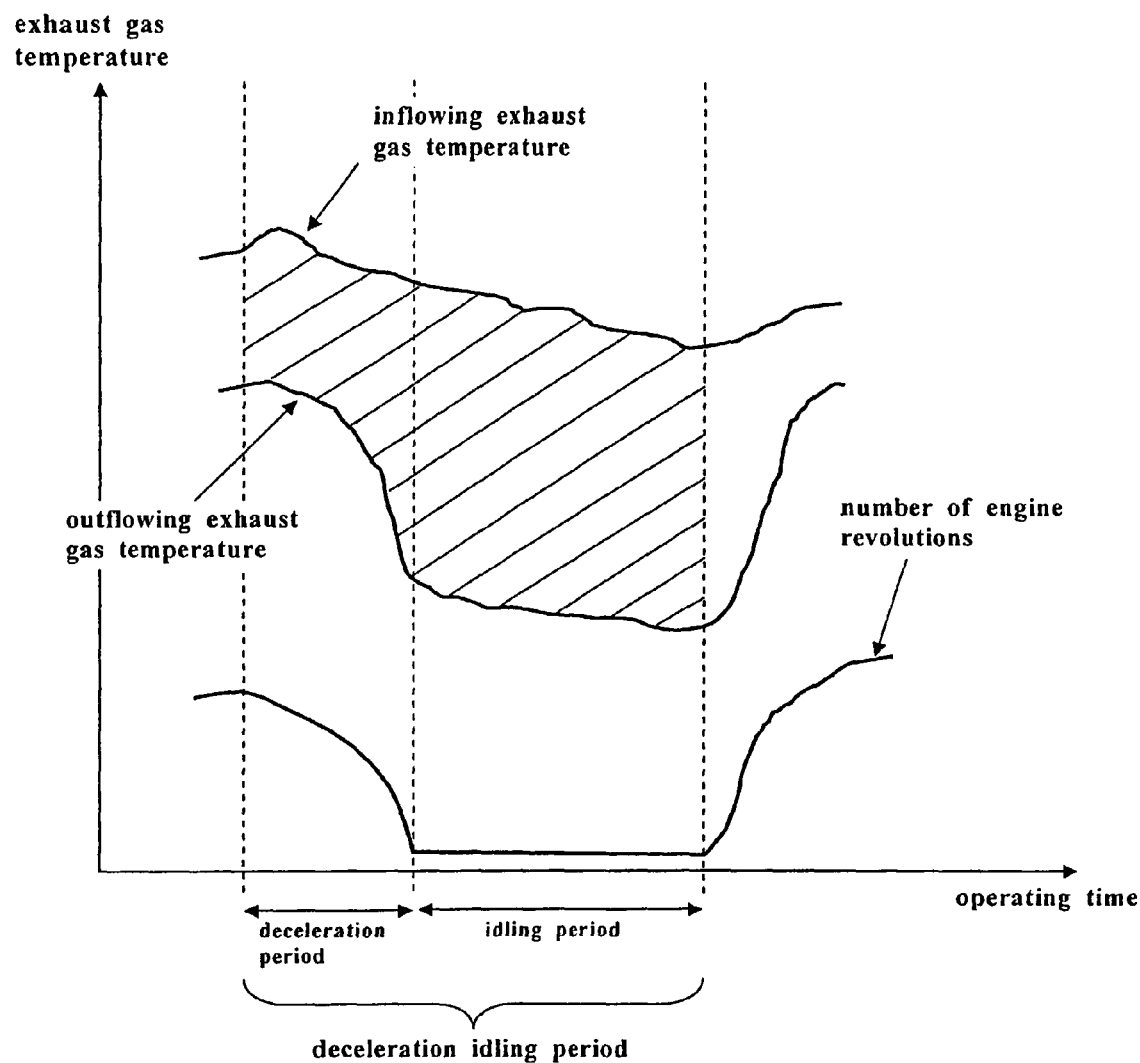
FIG. 4 shows an integrated relative difference between the inflowing exhaust gas temperature and the outflowing exhaust gas temperature during a deceleration idling period.

In view of this, in this embodiment, the relative difference of the inflowing exhaust gas temperature and the outflowing exhaust gas temperature is integrated based on transition of these temperatures during the deceleration idling period, and if the value obtained by integration is larger than a threshold value, it is determined that the particulate filter 5 is abnormal. Specifically, the area of the hatched portion in FIG. 4 is computed, and if the area is larger than a threshold value, it is determined that the particulate filter 5 is abnormal.

When abnormality determination is performed based on the transition of the inflowing exhaust gas temperature and the outflowing exhaust gas temperature, determination errors are unlikely to occur even if the decrease in the outflowing exhaust gas temperature under an abnormal state is small or if temporary changes in the inflowing exhaust gas temperature and the outflowing exhaust gas temperature occur.

Figure 5:
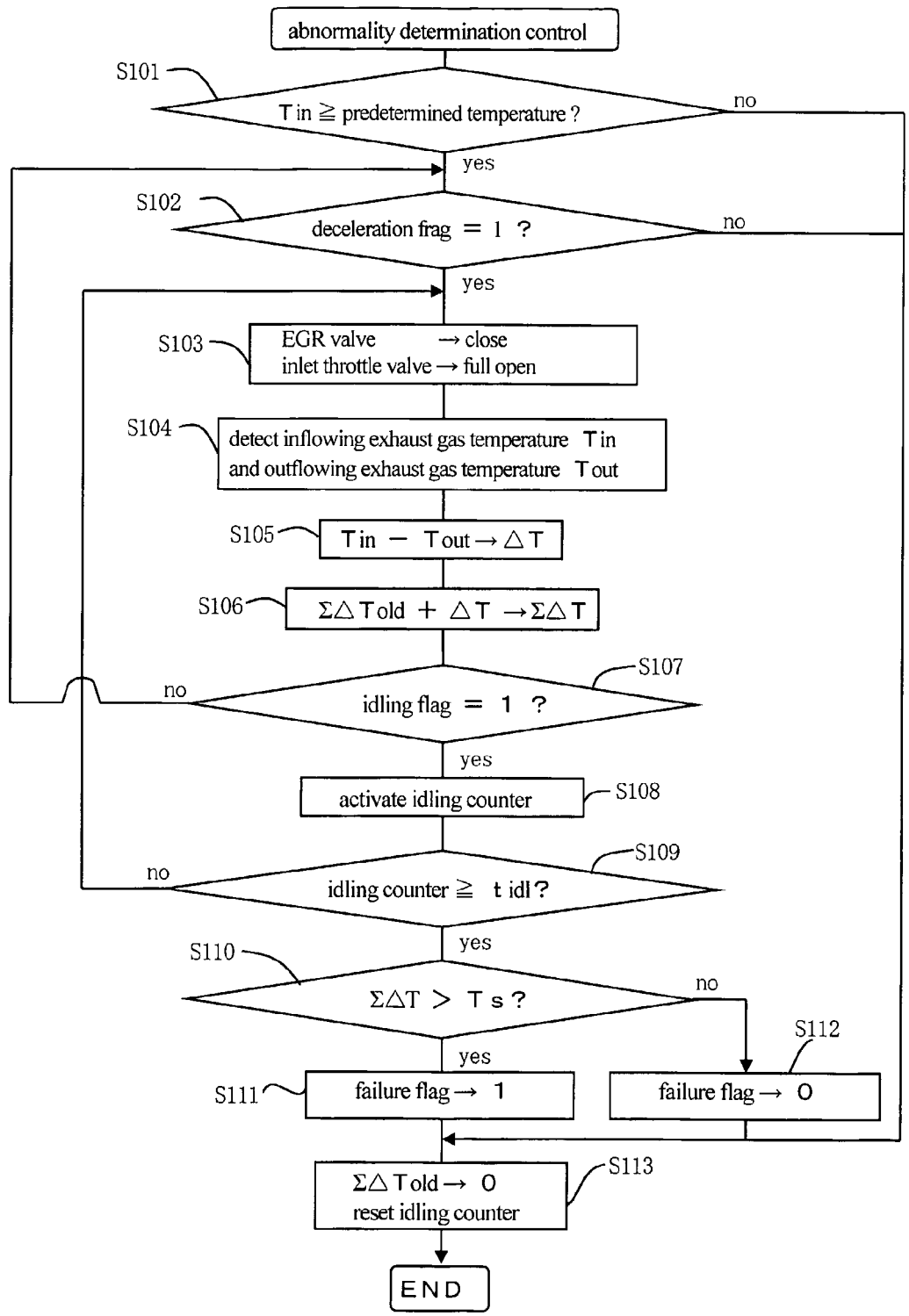
FIG. 5 is a flow chart of an abnormality determination control routine in embodiment 1.

In the following, abnormality determination control according to this embodiment will be described with reference to FIG. 5. FIG. 5 is a flow chart of a abnormality determination control routine according to embodiment 1. This abnormality determination control is a routine stored in a ROM of the ECU 11 in advance and executed by the ECU 11.

In the abnormality determination routine, firstly in step S101, a determination is made by the ECU 11 as to whether or not the inflowing exhaust gas temperature Tin is larger than or equal to a predetermined temperature. This predetermined temperature corresponds to the lower limit of the temperature range in which the catalyst of the particulate filter 5 is capable of oxidizing PM continuously.

If it is determined in step S101 that the inflowing exhaust gas temperature Tin is larger than or equal to the predetermined temperature, the process of the ECU 11 proceeds to step S102, in which a determination is made as to whether the value of deceleration flag is "1" or not.

The deceleration flag is a memory area set in a RAM or the like, in which value "1" is memorized when the number of engine revolutions is no less than a predetermined revolution number and the accelerator opening is fully closed, that is, when conditions for deceleration fuel cut are satisfied, and value "0" is memorized therein when the conditions for deceleration fuel cut are not satisfied.

If it is determined in step S102 that the value of the deceleration flag is "1", the process of the ECU 11 proceeds to step S103. In step S103, the ECU 11 closes the EGR valve 10 and controls to open the inlet throttle valve 4 fully. In this case, the quantity of intake air of the internal combustion engine 1 increases, and the quantity of flow of the exhaust gas flowing into the particulate filter 5 also increases accordingly.

In step S104, an output signal of the upstream exhaust gas temperature sensor 7 (i.e. the inflowing exhaust gas temperature Tin) and an output signal of the downstream exhaust gas temperature sensor 8 (i.e. the outflowing exhaust gas temperature Tout) are entered.

In step S105, the ECU 11 calculates the relative difference $\Delta T$ between the inflowing exhaust gas temperature Tin and the outflowing exhaust gas temperature Tout entered in step S104 mentioned above ($\Delta T = Tin - Tout$).

In step S106, the ECU 11 computes an updated integrated value $\Sigma \Delta T$ by adding the relative difference $\Delta T$ computed in step S105 to the integrated value $\Sigma \Delta Told$ computed in the latest execution of step S106. In this connection, the default value for the latest integrated value $\Sigma \Delta Told$ is "0".

In step S107, a determination is made by the ECU 11 as to whether the value of idling flag is "1" or not.

The idling flag is a memory area set in a RAM or the like, in which value "1" is memorized when the number of engine revolutions is less than a predetermined revolution number and the accelerator opening is fully closed, and value "0" is memorized therein when the number of engine revolutions is no less than the predetermined revolution number or when the accelerator opening is not fully closed.

If it is determined in step S107 that the value of the idling flag is "0", namely, when the internal combustion engine 1 is still continuing deceleration operating or when the operating state of the internal combustion engine 1 has shifted from deceleration operating state to acceleration operating state or steady operating state, the ECU 11 executes the above described process of step S102 and the subsequent steps again.

In this process, if the internal combustion engine 1 is continuing deceleration operating, it is determined in step S102 that the value of the deceleration flag is "1". On the other hand, if the operating state of the internal combustion engine 1 has shifted from deceleration operating state to acceleration operating state or steady operating state, it is determined in step S102 that the value of the deceleration flag is "0". If it is determined in step S102 that the value of the deceleration flag is "0", the ECU 11 executes the process of step 113 that will be described later and terminates the execution of this routine.

If it is determined in the aforementioned step S107 that the value of the idling flag is "1", in other words, if the operating state of the internal combustion engine 1 has shifted from deceleration operating state to idle operating state, the ECU 11 activates an idling counter in step S108. The idling counter is a counter for measuring the idle operating time.

In step S109, a determination is made by the ECU 11 as to whether or not the time (idle operating time) measured by the idling counter is no shorter than a specific time tidl, namely, whether or not the idle operating has been continued longer than or equal to the specific time.

If it is determined in step S109 that the time measured by the idling counter (the idle operating time) is shorter than the specific time tidl, the ECU 11 executes the above described process of step S103 and the subsequent steps repeatedly.

In this process, if the operating state of the internal combustion engine 1 has shifted from idle operating state to a non-idle operating state (in other words, if the operating state of the internal combustion engine 1 has shifted to a different operating state without continuing idle operating longer than or equal to the specific time), it is determined in step S107 that the value of the idling flag is "0", and then it is determined in step S102 that the value of the deceleration flag is "0". If it is determined in step S102 that the value of the deceleration flag is "0", the ECU 11 resets, in step S113, the integrated value $\Sigma\Delta$Told to the default value (=0) and resets the count of the idling counter to terminate the execution of this routine.

On the other hand, if it is determined in step S109 that the time measured by the idling counter is no shorter than the specific time tidl, the process of the ECU 11 proceeds to step S110, in which a determination is made as to whether the integrated value $\Sigma\Delta T$ computed in step S106 is larger than a threshold value Ts. The threshold value Ts is the value equal to the maximum value the integrated value $\Sigma\Delta T$ can assume while the particulate filter 5 is normal. The threshold value Ts is determined in advance by experiments.

If it is determined in step 110 that the integrated value $\Sigma\Delta T$ is larger than the threshold value Ts, it is considered by the ECU 11 that the particulate filter 5 is abnormal and memorize value "1" in failure flag in step S111.

If it is determined in step S110 that the integrated value $\Sigma\Delta T$ is no larger than the threshold value Ts, it is considered by the ECU 11 that the particulate filter 5 is normal, and memorize value "0" in the failure flag in step S112.

After execution of the process of said step S111 or S112, the process of the ECU 11 proceeds to step S113, in which the ECU 11 resets the integrated value $\Sigma\Delta$Told to the default value (=0) and resets the count of the idling counter to terminate the execution of this routine.

According to the abnormality determination method of this embodiment, it is possible to detect the behavior of the outflowing exhaust gas temperature that is peculiar to cases in which the particulate filter 5 is abnormal. Therefore, it is possible to determine an abnormality in the particulate filter 5 with a high degree of accuracy. In addition, by performing the abnormality determination control while the catalyst supported on the particulate filter 5 is capable of continuously oxidizing PM, it is possible to detect deterioration in the oxidizing ability of the catalyst.

Furthermore, since the abnormality determination method of this embodiment uses transition of the inflowing exhaust gas temperature and the outflowing exhaust gas temperature (in other words, transition of the inflowing exhaust gas temperature and the outflowing exhaust gas temperature) as parameters, it is possible to determine an abnormality with a high degree of accuracy even when the amount of the PM trapped in the particulate filter 5 is small.

Embodiment 2

Next, a case in which an abnormality in a particulate filter 5 is determined based on the degree of decrease in the outflowing exhaust gas temperature during a deceleration idling period will be described.

Figure 6:
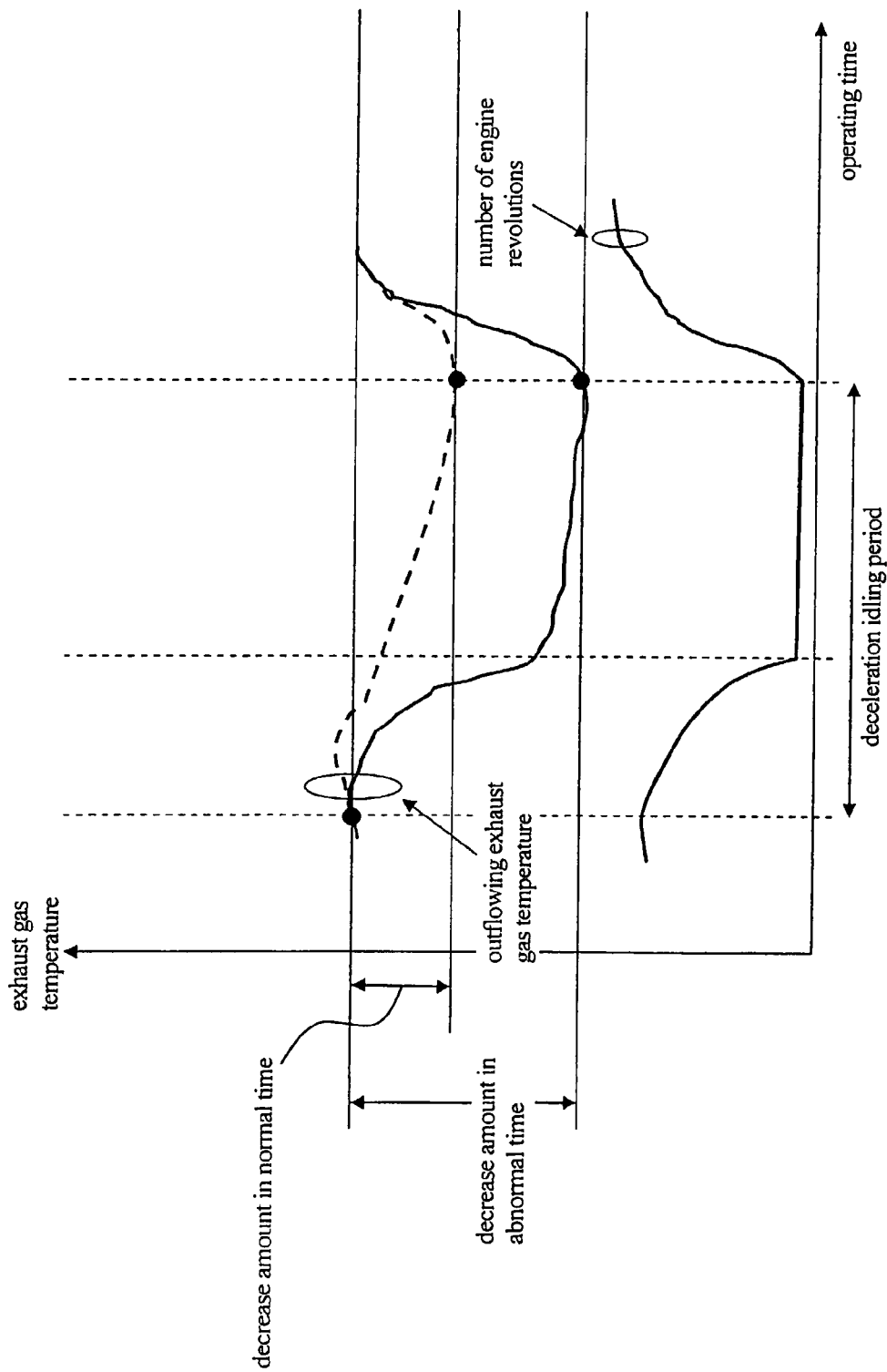
FIG. 6 shows the amount of decrease in the outflowing exhaust gas temperature during a deceleration idling period.

FIG. 6 is a graph showing behavior of the outflowing exhaust gas temperature during a deceleration idling period. In FIG. 6, the broken line represents the outflowing exhaust gas temperature in a case in which the particulate filter 5 is normal, and the solid line represents the outflowing exhaust gas temperature in a case in which the particulate filter 5 is abnormal.

In the case in which the particulate filter 5 is normal, the decrease amount of the outflowing exhaust gas temperature during the deceleration idling period is small. In contrast, in the case in which the particulate filter 5 is abnormal, the decrease amount of the outflowing exhaust gas temperature during the deceleration idling period becomes large. In other words, the decrease amount of the outflowing exhaust gas temperature differs between in the case in which the particulate filter 5 is normal and in the case in which the particulate filter 5 is abnormal.

In view of this, in this embodiment, the difference (i.e. the decrease amount of the temperature) between the outflowing exhaust gas temperature at the start of the deceleration idling period and outflowing exhaust gas temperature at the end of the deceleration idling period is computed, and if the difference exceeds a threshold value, it is determined that the particulate filter 5 is abnormal.

In connection with this, in the case where the abnormality in the particulate filter 5 is minor or in the case where the amount of the PM trapped in the particulate filter 5 is small, the decrease amount of the outflowing exhaust gas temperature may be small. In view of this, the abnormality determination shall be performed on condition that the catalyst supported on the particulate filter 5 is in a state in which it is capable of oxidizing PM continuously and the intake air quantity at the start of the deceleration idling period is larger than or equal to a predetermined amount.

Figure 7:
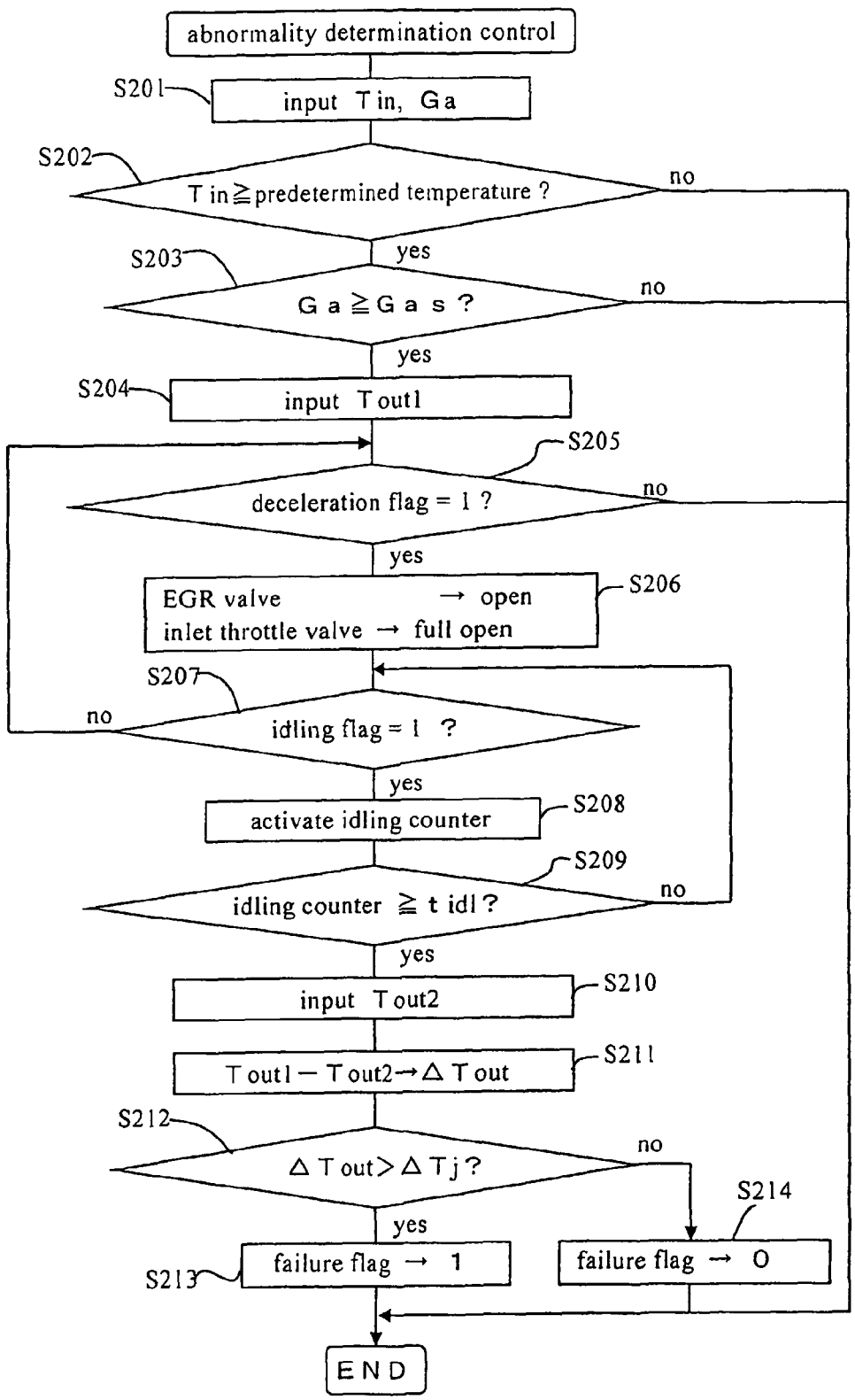
FIG. 7 is a flow chart of an abnormality determination control routine in embodiment 2.

In the following, an abnormality determination control according to this embodiment will be described with reference to FIG. 7. FIG. 7 is a flow chart of an abnormality determination control routine according to embodiment 2.

In this abnormality determination control routine, in step S201, the ECU 11 firstly takes in an output signal of the upstream exhaust gas temperature sensor 7 (i.e. the inflowing exhaust gas temperature) Tin and an output signal of the air flow meter 12 (i.e. the intake air quantity) Ga.

In step S202, a determination is made by the ECU 11 as to whether or not the inflowing exhaust gas temperature Tin entered in step S201 is higher than or equal to a predetermined temperature. This predetermined temperature corresponds to the lowest limit of the temperature range in which the catalyst on the particulate filter 5 is capable of continuously oxidizing PM.

If it is determined in step 202 that the inflowing exhaust gas temperature Tin is lower than the predetermined temperature, it is considered by the ECU 11 that the particulate filter 5 is not in the state in which it is capable of continuously oxidizing PM and terminates the execution of this routine.

If it is determined in step S202 that the inflowing exhaust gas temperature Tin is no lower than the predetermined temperature, it is considered by the ECU 11 that the particulate filter 5 is in the state in which it is capable of continuously oxidizing PM and the process proceeds to step S203.

In step S203, a determination is made by the ECU 11 as to whether or not the intake air quantity Ga entered in step S201 is larger than or equal to a predetermined quantity Gas. The predetermined quantity Gas is a value determined in such a way that the outflowing exhaust temperature shows a behavior different from that in normal time even if the quantity of PM passing through the particulate filter 5 is small and the amount of the trapped PM is small. The predetermined quantity Gas is determined in advance by experiments.

If it is determined in step S203 that the intake air quantity Ga is smaller than the predetermined quantity Gas, the ECU 11 terminates the execution of this routine. On the other hand, if it is determined in step S203 that the intake air quantity Ga is no smaller than the predetermined quantity Gas, the process of the ECU 11 proceeds to step S204.

In step S204, the ECU 11 takes in an output signal of the downstream exhaust gas temperature sensor 8 and stores this output signal in a RAM as the outflowing exhaust gas temperature at the start of the deceleration idling period Tout1.

In step S205, a determination is made by the ECU 11 as to whether the value of the deceleration flag is "1" or not. If it is determined in step S205 that the value of the deceleration flag is "0", the ECU 11 terminates the execution of this routine. On the other hand, if it is determined in step S205 that the value of the deceleration flag is "1", the process of the ECU 11 proceeds to step S206.

In step S206, the ECU 11 controls to close the EGR valve 10 and to open the inlet throttle valve 4 fully so as to increase the intake air quantity during the deceleration idling period (or the quantity of flow of the exhaust gas flowing into the particulate filter 5 during the deceleration idling period).

In step S207, a determination is made by the ECU 11 as to whether the value of the idling flag is "1" or not. If it is determined in step S207 that the value of the idling flag is "0", the ECU 11 executes the process of step S205 and the subsequent steps again.

If it is determined in step S207 that the value of the idling flag is "1", the process of the ECU 11 proceeds to step S208. In step S208, the ECU 11 activates the idling counter.

In step S209, a determination is made by the ECU 11 as to whether the time measured by the idling counter (the idle operating time) is longer than or equal to a specific time tidl.

If it is determined in step S209 that the time measured by the idling counter is shorter than the specific time tidl, the ECU 11 executes the process of step S207 and the subsequent steps repeatedly.

If it is determined in step S209 that the time measured by the idling counter is not shorter than the specific time tidl, the process of the ECU 11 proceeds to step S210. In step S210, the ECU 11 takes in an output signal of the downstream exhaust gas temperature sensor 8 and stores this output signal as the outflowing exhaust gas temperature at the end of the deceleration idling period Tout2.

In step S211, the ECU 11 computes the temperature decrease amount $\Delta$Tout (=Tout1−Tout2) by subtracting the outflowing exhaust gas temperature at the end of the deceleration idling period Tout2 from the outflowing exhaust gas temperature at the start of the deceleration idling period Tout1.

In step S212, a determination is made by the ECU 11 as to whether the temperature decrease amount $\Delta$Tout is lager than a threshold value $\Delta$Tj. The threshold value $\Delta$Tj is a value equal to the maximum value the temperature decrease amount $\Delta$Tout can assume while the particulate filter 5 is normal. The threshold value $\Delta$Tj is determined in advance by experiments.

If it is determined in step S212 that the temperature decrease amount $\Delta$Tout is larger than the threshold value $\Delta$Tj, it is considered by the ECU 11 that the particulate filter 5 is abnormal, and the value "1" is memorized in the failure flag in step 213.

If it is determined in step S212 that the temperature decrease amount $\Delta$Tout is not larger than the threshold value $\Delta$Tj, it is considered by the ECU 11 that the particulate filter 5 is normal, and the value "0" is memorized in the failure flag in step S214.

According to the abnormality determination method of this embodiment, it is possible to detect the behavior of the outflowing exhaust gas temperature that is peculiar to cases in which the particulate filter 5 is abnormal based on the decrease amount of the outflowing exhaust gas temperature during the deceleration idling period. Therefore, it is possible to perform abnormality determination with a logic simpler than that in the above described embodiment 1.

Embodiment 3

Next, a case in which the outflowing exhaust gas temperature at the end of the deceleration idling period is estimated by computation and an abnormality in the particulate filter 5 is determined based on the difference between the estimated value and a value obtained by actual measurement will be described.

An example of the method of estimating the outflowing exhaust gas temperature at the end of the deceleration idling period by calculation is making a model of the heat budget of the exhaust system extending from the upstream exhaust gas temperature sensor 7 to the downstream exhaust gas temperature sensor 8 and estimating the outflowing exhaust gas temperature by calculation using that model.

The above-mentioned model may be divided into the first model for the heat budget of the exhaust system extending from the upstream exhaust gas temperature sensor 7 to the particulate filter 5, the second model for the heat budget in the particulate filter 5 and the third model for the heat budget of the exhaust system extending from the particulate filter 5 to the downstream exhaust gas temperature sensor 8.

The first model is one for computing the heat energy that the exhaust gas has at the entrance of the particulate filter 5 (which will be referred to as the filter inflowing heat energy hereinafter). The first model is a model simulating the relationship of the molar specific heat at constant pressure of the exhaust passage 3 extending from the upstream exhaust gas temperature sensor 7 to the particulate filter 5, the temperature of the exhaust gas passing the upstream exhaust gas temperature sensor 7, the quantity of flow of the exhaust gas passing the upstream exhaust gas temperature sensor 7 and the filter inflowing heat energy.

The second model is one for computing the heat energy that the exhaust gas has at the exit of the particulate filter 5 (which will be referred to as the filter outflowing heat energy hereinafter). The second model is a model simulating the relationship of the filter inflowing heat energy, the heat conductivity of the particulate filter 5, the molar specific heat at constant volume of the particulate filter 5, the temperature of the catalyst supported on the particulate filter 5 (catalyst bed temperature), the mass of the catalyst, the heat energy generated when the reduction components contained in the exhaust gas (hydrocarbon (HC) and carbon monoxide (CO) etc.) are oxidized (the heat energy generated by oxidation of PM is also included, if the catalyst is in a state in which it is capable of continuously oxidizing PM) and the filter outflowing heat energy.

The third model is one for computing the heat energy that the exhaust gas has upon passing the downstream exhaust gas temperature sensor 8 (which will be referred to as the sensor passing heat energy hereinafter). The third model is a model simulating the filter outflowing heat energy, the heat loss coefficient of the exhaust passage 3 extending from the particulate filter 5 to the downstream exhaust gas temperature sensor 8, the molar specific heat at constant pressure of the exhaust passage 3 extending from the particulate filter 5 to the downstream exhaust gas temperature sensor 8, the quantity of flow of the exhaust gas passing the downstream exhaust gas temperature sensor 8, the atmospheric temperature and the sensor passing heat energy.

By performing computation in accordance with the first to the third models sequentially, the outflowing exhaust gas temperature at the end of the deceleration idling period in the case where the particulate filter 5 is normal is estimated. The outflowing exhaust gas temperature thus estimated (which will be referred to as the estimated outflowing exhaust gas temperature hereinafter) is compared with the output signal 8 of the downstream exhaust gas temperature sensor 8 at the end of the deceleration idling period (which will be referred to as the actually measured outflowing exhaust gas temperature hereinafter).

As described before, when the particulate filter 5 is normal, the outflowing exhaust gas temperature is unlikely to decrease during the deceleration idling period, but when the particulate filter 5 is abnormal, the outflowing exhaust gas temperature significantly decreases during the deceleration idling period.

Therefore, if the actually measured outflowing exhaust gas temperature is lower than the estimated outflowing exhaust gas temperature by more than a predetermined temperature, it may be determined that the particulate filter 5 is abnormal.

Figure 8:
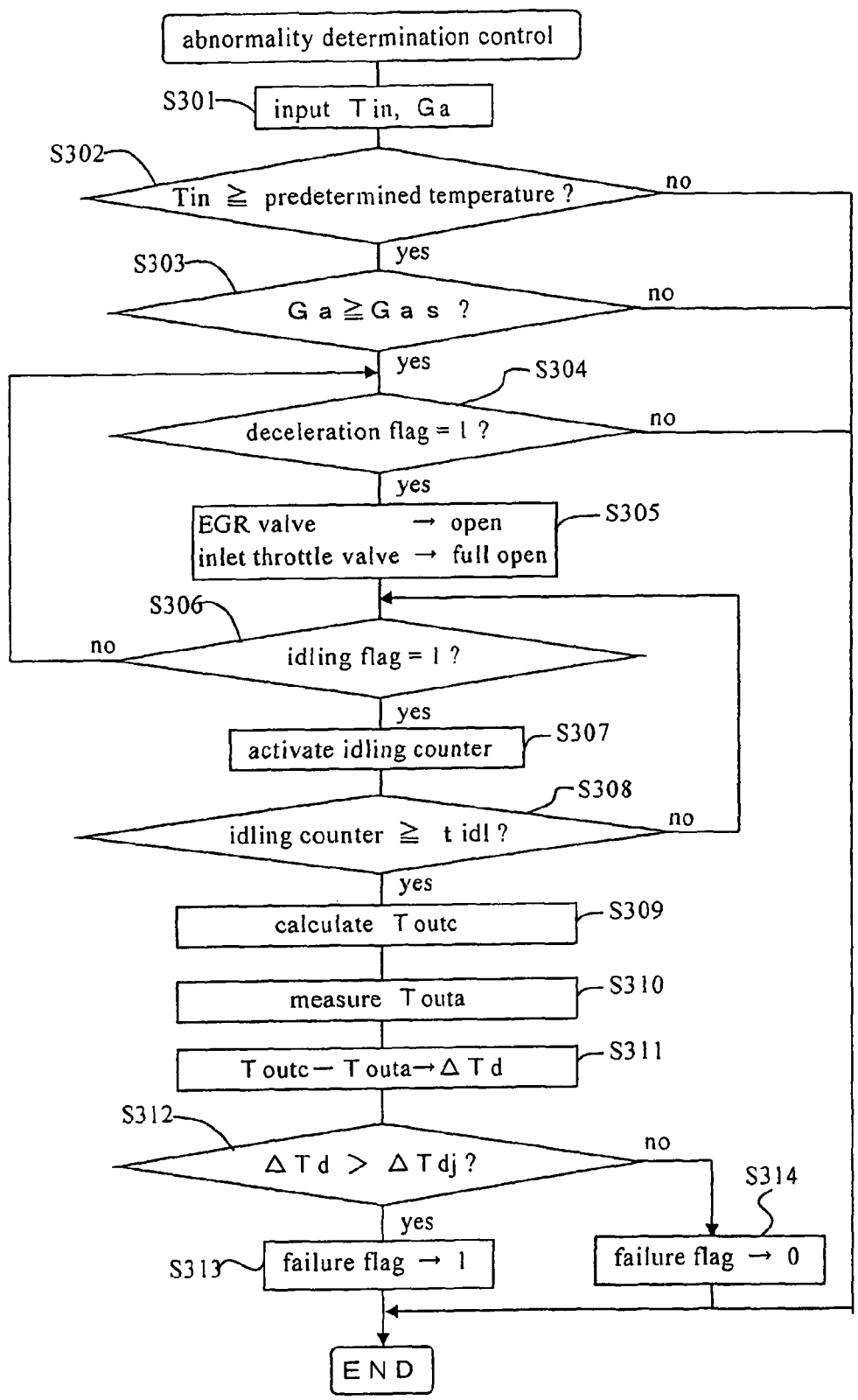
FIG. 8 is a flow chart of an abnormality determination control routine in embodiment 3.

In the following, abnormality determination control according to this embodiment will be described with reference to FIG. 8. FIG. 8 is a flow chart of an abnormality determination control routine in embodiment 3.

In steps S301 to S303 of this abnormality determination control routine, the ECU 11 executes the process same as that in step S201 to S202 of the abnormality determination control routine in the above-described embodiment 2.

In step S304, a determination is made by the ECU 11 as to whether the value of the deceleration flag is "1" or not. If it is determined in step S304 that the value of the deceleration flag is "0", the ECU 11 terminates the execution of this routine. On the other hand, if it is determined in step S304 that the value of the deceleration flag is "1", the process of the ECU 11 proceeds to step S305.

In step S305, the ECU 11 controls to close the EGR valve 10 and to open the inlet throttle valve 4 fully.

In step S306, a determination is made by the ECU 11 as to whether the value of the idling flag is "1" or not. If it is determined in step S306 that the value of the idling flag is "0", the ECU 11 executes the process of step S304 and the subsequent steps again.

If it is determined in step S306 that the value of the idling flag is "1", the process of the ECU 11 proceeds to step S307. In step S307, the ECU 11 activates the idling counter.

In step S308, a determination is made by the ECU 11 as to whether or not the time measured by the idling counter (the idle operating time) is larger than or equal to a specific time tidl.

If it is determined in step S308 that the time measured by the idling counter is shorter than the specific time tidl, the ECU 11 executes the process of step S306 and the subsequent steps repeatedly.

If it is determined in step S308 that the time measured by the idling counter is not shorter than the specific time tidl, the process of the ECU 11 proceeds to step S309. In step S309, the ECU 11 computes the estimated outflowing exhaust gas temperature at the end of the deceleration idling period Toutc in accordance with the above-mentioned model.

In step S310, the ECU 11 takes in an output signal form the downstream exhaust gas temperature sensor 8 and stores this output signal in a RAM as the actually measured outflowing exhaust gas temperature at the end of the deceleration idling period Touta.

In step S311, the ECU 11 computes the aforementioned temperature difference ΔTd by subtracting the actually measured outflowing exhaust gas temperature Touta from the above-mentioned estimated outflowing exhaust gas temperature Toutc.

In step S312, a determination is made by the ECU 11 as to whether or not the aforementioned temperature difference ΔTd is larger than a threshold value ΔTdj. The threshold value ΔTdj is determined based on the range of errors of the estimated outflowing exhaust gas temperature Toutc in the case where the particulate filter 5 is normal. The threshold value ΔTdj is determined in advance by experiments.

If it is determined in step S312 that the aforementioned temperature difference ΔTd is larger than the threshold value ΔTdj, it is considered by the ECU 11 that the particulate filter 5 is abnormal, and the value "1" is memorized in the failure flag in step S313.

If it is determined in step S312 that the aforementioned temperature difference ΔTd is not larger than the threshold value ΔTdj, it is considered by the ECU 11 that the particulate filter 5 is normal, and the value "0" is memorized in the failure flag in step S314.

According to the abnormality determination method of this embodiment, it is possible to determine an abnormality in the particulate filter 5 using the outflowing exhaust gas temperature at the end of the deceleration idling period as a parameter.

Embodiment 4

The above description of embodiment 2 was directed to a case in which an abnormality in a particulate filter 5 is determined based on the decrease amount of the outflowing exhaust gas temperature during a deceleration idling period. In contrast to this, in this embodiment 4, a case in which an abnormality of the particulate filter 5 is determined based on the relative difference between the decrease amount in the case where the amount of the trapped PM is large and the decrease amount in the case where the amount of the trapped PM is small.

Figure 9:
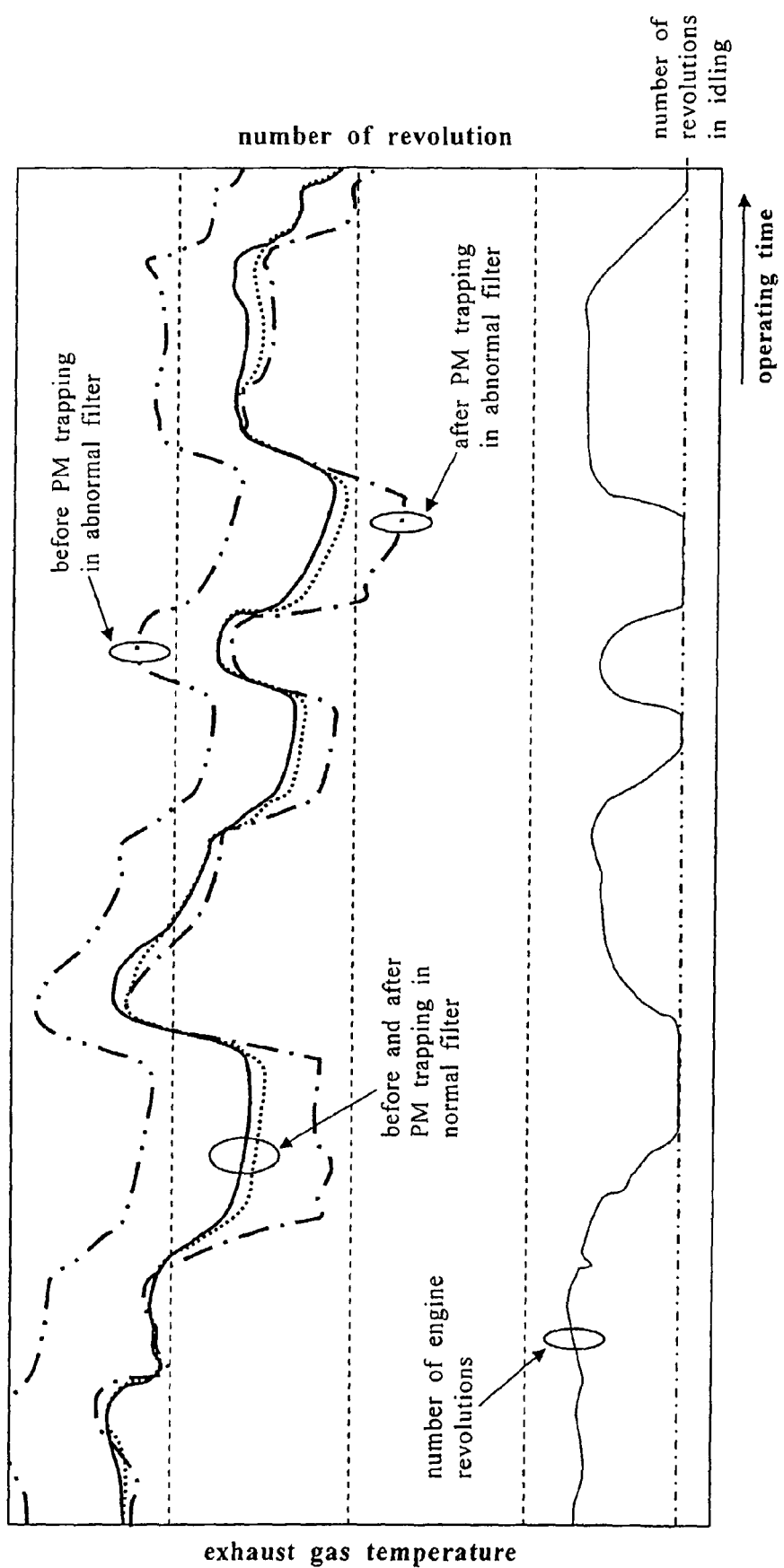
FIG. 9 shows results of measurement of the outflowing exhaust gas temperature performed before and after PM is trapped.

FIG. 9 shows results of measurement of the outflowing exhaust gas temperature performed before and after PM is trapped for a normal particulate filter and an abnormal particulate filter. The outflowing exhaust gas temperature before trapping of PM was measured just after performing a process of forcibly regenerating the PM trapping ability of the particulate filter (i.e. the regeneration process). The outflowing exhaust gas temperature after trapping of PM was measured just before performing the regeneration process.

The dotted line and the solid line in FIG. 9 represent the outflowing exhaust gas temperature before and after trapping of PM in a normal particulate filter. The chain line in FIG. 9 represents the outflowing exhaust gas temperature after trapping of PM in an abnormal particulate filter. The chain double-dashed line in FIG. 9 represents the outflowing exhaust gas temperature before trapping of PM in the abnormal particulate filter.

When the particulate filter is normal, the behavior of the outflowing exhaust gas temperature before trapping of PM and the behavior of the outflowing exhaust gas temperature after trapping of PM are substantially the same, and there is no significant difference in the decrease amounts during the deceleration idling period between them.

On the other hand, when the particulate filter is abnormal, the behavior of the outflowing exhaust gas temperature before trapping of PM and the behavior of the outflowing exhaust gas temperature after trapping of PM are quite different and there is a distinct difference in the decrease amount during the deceleration idling period between them.

As per the above, when the particulate filter is abnormal, the outflowing exhaust gas temperature after trapping of PM is low as compared with the outflowing exhaust gas temperature before trapping of PM. In addition, the decrease amount of the outflowing exhaust gas temperature during the deceleration idling period after trapping of PM is larger than that before trapping of PM.

It is considered that the this is because when the particulate filter is abnormal, the heat quantity transferred to/from the exhaust gas in the particulate filter decreases as the amount of the trapped PM increases.

In view of the above-described characteristics of the outflowing exhaust gas temperature, it is possible to determine an abnormality in the particulate filter 5 by comparing the decrease amount of the outflowing exhaust gas temperature before trapping of PM and the decrease amount of the outflowing exhaust gas temperature after trapping of PM, or by comparing the outflowing exhaust gas temperature before trapping of PM and the outflowing exhaust gas temperature after trapping of PM.

Specifically, if the relative difference between the decrease amount of the outflowing exhaust gas temperature before trapping of PM and the decrease amount of the outflowing exhaust gas temperature after trapping of PM exceeds a threshold value, or if the relative temperature difference between the outflowing exhaust gas temperature before trapping of PM and the outflowing exhaust gas temperature after trapping of PM exceeds a threshold value, it may be determined that the particulate filter 5 is abnormal.

In the following, a method of determining abnormality based on the relative difference between the decrease amount of the outflowing exhaust gas temperature before trapping of PM and the decrease amount of the outflowing exhaust gas temperature after trapping of PM will be specifically described.

Figure 10:
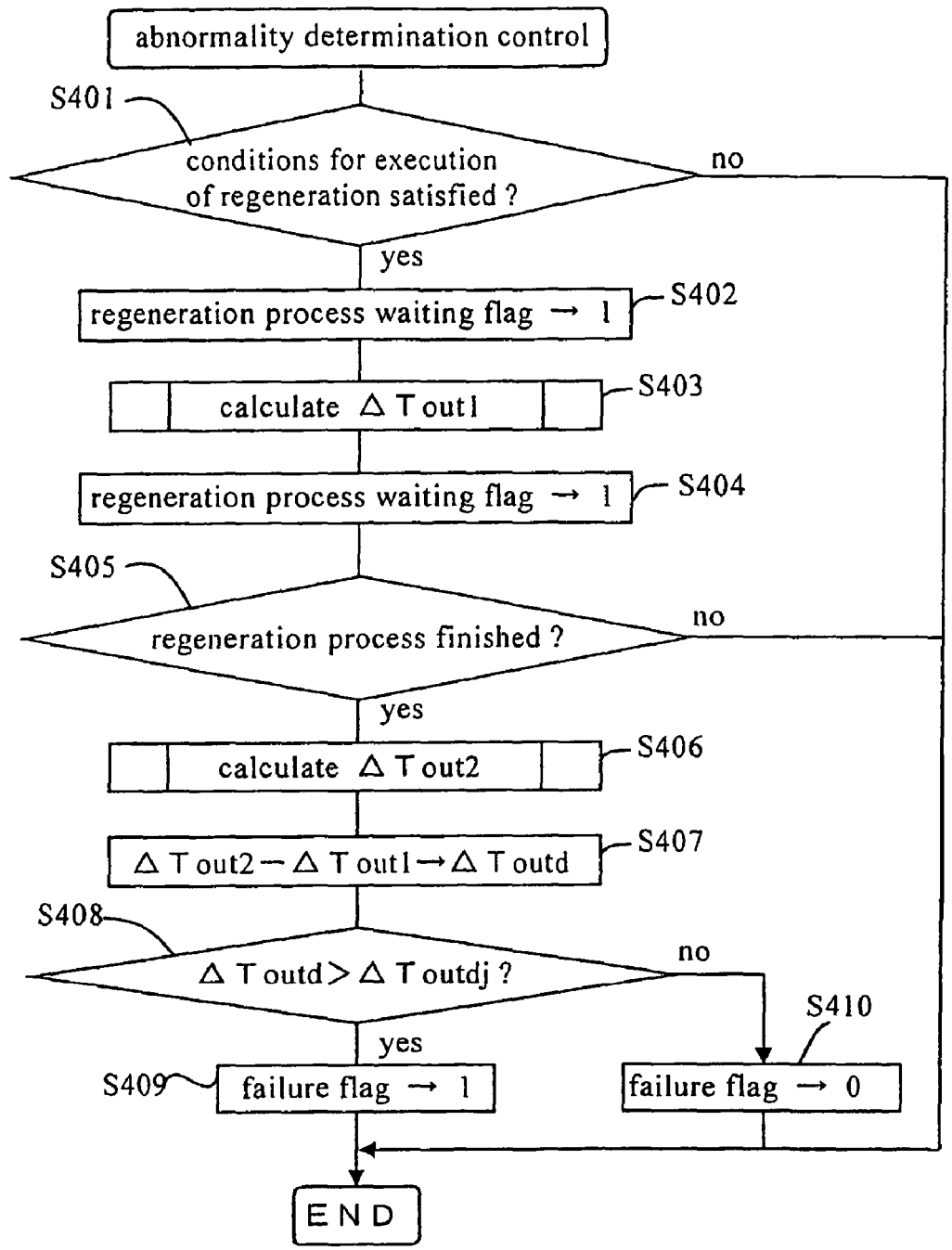
FIG. 10 is a flow chart of an abnormality determination control routine in embodiment 4.

FIG. 10 is a flow chart of an abnormality determination control routine in embodiment 4. In this abnormality determination routine, firstly in step S401, a determination is made by the ECU 11 as to whether the condition for executing the regeneration process is satisfied or not.

The condition for executing the regeneration process is that the amount of the PM trapped in the particulate filter 5 is larger than a predetermined amount. The amount of the trapped PM is estimated by a known method utilizing the integrated intake air quantity of the internal combustion engine 1, the integrated fuel injection amount and the integrated driving time etc. as parameters.

If it is determined in step S401 that the condition for executing the regeneration process is not satisfied, the ECU 11 terminates the execution of this routine.

If it is determined in step S401 that the condition for executing the regeneration process is satisfied, the ECU 11 changes, in step S402, the value of regeneration process waiting flag to "1". The regeneration process waiting flag is a memory area set in a RAM or the like in advance, in which value "1" is memorized when the condition for executing the regeneration process is satisfied, and value "0" is memorized when the decrease amount of the outflowing exhaust gas temperature after trapping of PM is computed.

When the value of the regeneration process waiting flag is "1", execution of the regeneration process is prohibited in a separate regeneration execution routine. When the value of the regeneration process waiting flag is "0", execution of the regeneration process is allowed in said separate regeneration execution routine.

In step S403, the ECU 11 computes the decrease amount of the outflowing exhaust gas temperature after trapping of PM (or the decrease amount after PM trapping) $\Delta Tout1$. The process of this computation is the same as the process of steps S201 to S211 of the abnormality determination routine in the above-described embodiment 2.

In step S404, the ECU 11 changes the value of the regeneration process waiting flag to "0". In this case, the regeneration process is executed by the separate regeneration process execution routine.

In step S405, a determination is made by the ECU 11 as to whether execution of the regeneration process has been finished or not. If it is determined in step S405 that execution of the regeneration process has not been finished, the ECU 11 execute the process of step S405 repeatedly until execution of the regeneration process is finished.

If it is determined in step S405 that execution of the regeneration process has been finished, the process of the ECU 11 proceeds to step S406. In step S406, the ECU 11 computes the decrease amount of the outflowing exhaust gas temperature before trapping of PM (or the decrease amount before PM trapping) $\Delta Tout2$. The process of this computation is also the same as the process of steps S201 to S211 of the abnormality determination routine in the above-described embodiment 2.

In step S407, the ECU 11 subtracts the relative difference between the decrease amount after PM trapping $\Delta Tout1$ computed in step S403 from the decrease amount before PM trapping $\Delta Tout2$ computed in step S406 to obtain the relative difference $\Delta Toutd$ of them.

In step S408, a determination is made by the ECU 11 as to whether or not the relative difference $\Delta Toutd$ computed in step S407 is larger than a threshold value $\Delta Toutdj$. The threshold value $\Delta Toutdj$ is a value equal to the maximum value that the relative difference $\Delta Toutd$ can assume when the particulate filter 5 is normal. The threshold value $\Delta Toutdj$ is determined in advance by experiments.

If it is determined in step S408 that the above-mentioned relative difference $\Delta Toutd$ is larger than the threshold value $\Delta Toutdj$, it is considered by the ECU 11 that the particulate filter 5 is abnormal, and value "1" is memorized in the failure flag in step S409.

If it is determined in step S408 that the relative difference $\Delta Toutd$ is not larger than the threshold value $\Delta Toutdj$, it is considered by the ECU 11 that the particulate filter 5 is normal, and value "0" is memorized in the failure flag in step S410.

According to the abnormality determination method of this embodiment, the degree of accuracy of determination can be enhanced since an abnormality in the particulate filter 5 is determined based on the relative difference between the decrease amount before PM trapping and the decrease amount after PM trapping.

Embodiment 5

Although in the above-described embodiments 1 to 3, the threshold values (Ts in embodiment 1, ΔTj in embodiment 2, ΔTdj in embodiment 3) are fixed values, they may be variable values that are changed in accordance with the amount of PM trapped in the particulate filter 5.

The behavior of the outflowing exhaust gas temperature peculiar to cases in which particulate filter 5 is abnormal becomes more distinct as the amount of the trapped PM increases. Conversely, the behavior of the outflowing exhaust gas temperature peculiar to cases in which particulate filter is abnormal becomes less distinct as the amount of the trapped PM decreases.

Accordingly, when the amount of the trapped PM is small, the determination criterion may be made lower (i.e. the threshold value may be made smaller) than in the case where the amount of the trapped PM is large.

By making the determination criterion variable, it is possible to determine an abnormality in the particulate filter 5 even in the situation in which the amount of the trapped PM is small, and in addition, it is possible to reduce occurrence of determination errors in the situation in which the amount of the trapped PM is large.

Embodiment 6

Although in the above-described embodiments 1 to 3, abnormality determination is performed without paying attention to the amount of the PM trapped in the particulate filter 5, abnormality determination may be performed on condition that the amount of the trapped PM is no less than a predetermined amount.

The behavior of the outflowing exhaust gas temperature peculiar to cases in which particulate filter is abnormal becomes more distinct when the amount of the trapped PM is no less than (large than or equal to) when the amount of the trapped PM is small. Therefore, if an abnormality determination control is executed on condition that the amount of the trapped PM is larger than a predetermined amount, the degree of accuracy of the determination can be enhanced.

Embodiment 7

Although in the above-described embodiments 1 to 4, an abnormality in the particulate filter 5 is determined based on behavior of the outflowing exhaust gas temperature during a deceleration idling period, the abnormality determination method according to any one of embodiments 1 to 4 may be employed in combination with a known abnormality determination method that uses the pressure difference between the upstream and the downstream of the particulate filter 5 as a parameter.

When an abnormality that allows passing of PM is present in the particulate filter 5, the pressure difference between the upstream and the downstream becomes smaller than when the particulate filter 5 is normal. Therefore, if the pressure difference between the upstream and the downstream becomes smaller than a predetermined value, it may be determined that the particulate filter 5 is abnormal.

However, since a significant pressure difference between the upstream and the downstream is unlikely to be generated when the amount of flow of the exhaust gas flowing into the particulate filter 5 is small, it is preferred that the abnormality determination method based on the pressure difference between the upstream and the downstream be executed during high-speed, high-load operating where the amount of flow of the exhaust gas is large.

To the contrary, in the above-described abnormality determination methods according to embodiments 1 to 4, determination accuracy is enhanced while the methods are executed in during deceleration operating or idle operating.

Therefore, if any one of the above-described abnormality determination methods according to embodiments 1 to 4 is used in combination with the abnormality determination method based on the pressure difference between the upstream and the downstream, abnormality determination can be performed with a high degree of accuracy during high-speed and high-load operating as well as during deceleration operating and idle operating. Thus, accuracy of determination can be enhanced.

Moreover, accuracy of determination can be further enhanced if the final decision of abnormality determination is made only in the case that the particulate filter 5 is determined to be abnormal by both the abnormality determination methods.

The invention claimed is:

1. A method of determining an abnormality in a particulate filter that is disposed in an exhaust passage of an internal combustion engine for trapping and oxidizing particulate matter, comprising determining that the particulate filter is abnormal when an integrated value of a difference between an outflowing exhaust gas temperature of the particulate filter relative to an inflowing exhaust gas temperature thereof during deceleration operating exceeds a predetermined value,
    wherein the integrated value during a time period from a time before start of deceleration operating until idle operating time becomes no shorter than a predetermined time, on condition that idle operating is continued no shorter than the predetermined time after deceleration operating.

2. The method of determining an abnormality in a particulate filter according to claim 1 further comprising stopping an EGR when detecting the integrated value.

3. The method of determining an abnormality in a particulate filter according to claim 1, further comprising increasing a degree of opening of an inlet throttle valve when detecting the integrated value.

4. The method of determining an abnormality in a particulate filter according to claim 2, further comprising increasing a degree of opening of an inlet throttle valve when detecting the integrated value.

5. The method of determining an abnormality in a particulate filter according to claim 1, further comprising performing abnormality determination on condition that the temperature of the particulate filter is no less than a predetermined temperature and that the quantity of intake air is no less than a predetermined quantity.

6. The method of determining an abnormality in a particulate filter according to claim 4, further comprising performing abnormality determination on condition that the temperature of the particulate filter is no less than a predetermined temperature and that the quantity of intake air is no less than a predetermined quantity.

7. The method of determining an abnormality in a particulate filter according to claim 1, further comprising performing abnormality determination on condition that the temperature of the particulate filter is in a temperature range in which the particulate filter is capable of continuously oxidizing particulate matter.

8. The method of determining an abnormality in a particulate filter according to claim 6, further comprising performing abnormality determination on condition that the temperature of the particulate filter is in a temperature range in which the particulate filter is capable of continuously oxidizing particulate matter.

9. The method of determining an abnormality in a particulate filter according to claim 1, further comprising performing estimation of the amount of particulate matter trapped in the particulate filter, and increasing a determination criterion when the estimated amount of the trapped particulate matter is large than when the estimated amount of the trapped particulate matter is small.

10. The method of determining an abnormality in a particulate filter according to claim 8, further comprising performing estimation of the amount of particulate matter trapped in the particulate filter, and increasing a determination criterion when the estimated amount of the trapped particulate matter is large than when the estimated amount of the trapped particulate matter is small.

11. The method of determining an abnormality in a particulate filter according to claim 1, further comprising performing estimation of the amount of particulate matter trapped in the particulate filter, and performing abnormality determination on condition that the estimated amount of the trapped particulate matter is no less than a predetermined amount.

12. A method of determining an abnormality in a particulate filter that is disposed in an exhaust passage of an internal combustion engine for trapping and oxidizing particulate matter, comprising determining that the particulate filter is abnormal when a degree of decrease in an outflowing exhaust gas temperature after deceleration operating relative to an outflowing exhaust gas temperature of the particulate filter before starting deceleration operating exceeds a predetermined value.

13. The method of determining an abnormality in a particulate filter according to claim 12, further comprising determining that the particulate filter is abnormal when said temperature difference exceeds a predetermined value.

14. The method of determining an abnormality in a particulate filter according to claim 12, further comprising determining that the particulate filter is abnormal when a difference between said temperature difference at a time when regeneration of the particulate filter is required and said temperature difference after regeneration of the particulate filter exceeds a predetermined value.

\* \* \* \* \*